United States Patent
Krishnamoorthy et al.

(10) Patent No.: US 10,070,387 B2
(45) Date of Patent: Sep. 4, 2018

(54) DEEP SLEEP MODE ABORT MECHANISM FOR MACHINE-TYPE COMMUNICATION DEVICES

(71) Applicant: QUALCOMM Incorporated, San Diego, CA (US)

(72) Inventors: Parthasarathy Krishnamoorthy, San Diego, CA (US); Liangchi Hsu, San Diego, CA (US); Srinivasan Balasubramanian, San Diego, CA (US); Naveen Kumar Pasunooru, Hyderabad (IN); Prashanth Mohan, Chennai (IN); Raevanth Venkat Annam, Turticorin (IN); Shravan Kumar Raghunathan, San Diego, CA (US); Muthukumaran Dhanapal, San Diego, CA (US); Ankit Maheshwari, Hyderabad (IN); Akash Kumar, Hyderabad (IN); Atul Soni, Hyderabad (IN)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 15/467,881

(22) Filed: Mar. 23, 2017

(65) Prior Publication Data

US 2017/0339640 A1 Nov. 23, 2017

(30) Foreign Application Priority Data

May 18, 2016 (IN) .............................. 201621017185

(51) Int. Cl.
*H04W 52/02* (2009.01)
*H04W 60/04* (2009.01)
(Continued)

(52) U.S. Cl.
CPC ......... *H04W 52/0229* (2013.01); *H04W 4/70* (2018.02); *H04W 52/0216* (2013.01);
(Continued)

(58) Field of Classification Search
CPC ............. H04W 52/0229; H04W 4/005; H04W 52/0216; H04W 60/04; H04W 72/048; H04L 67/12
See application file for complete search history.

(56) References Cited

U.S. PATENT DOCUMENTS

| | | | |
|---|---|---|---|
| 8,526,947 B1 * | 9/2013 | Shahaf | H04W 52/0216 455/435.1 |
| 9,363,753 B2 | 6/2016 | Damnjanovic et al. | |

(Continued)

FOREIGN PATENT DOCUMENTS

| | | |
|---|---|---|
| WO | 2009024925 A2 | 2/2009 |
| WO | WO-2016167615 A1 | 10/2016 |

OTHER PUBLICATIONS

"International Search Report and Written Opinion—PCT/US2017/027963—ISA/EPO—dated Aug. 23, 2017".

*Primary Examiner* — Ian N Moore
*Assistant Examiner* — Latresa McCallum
(74) *Attorney, Agent, or Firm* — Harrity & Harrity, LLP/Qualcomm

(57) ABSTRACT

Certain aspects of the present disclosure generally relate to wireless communication. In some aspects, a user equipment may receive sensor information from a sensor associated with the user equipment, wherein the user equipment is in a deep sleep mode when the sensor information is received. The user equipment may deactivate the deep sleep mode, based at least in part on receiving the sensor information, to permit the user equipment to transmit or decode a network communication.

30 Claims, 15 Drawing Sheets

(51) Int. Cl.
*H04W 4/70* (2018.01)
*H04L 29/08* (2006.01)

(52) U.S. Cl.
CPC ............. *H04W 60/04* (2013.01); *H04L 67/12* (2013.01); *Y02D 70/20* (2018.01)

(56) References Cited

U.S. PATENT DOCUMENTS

| | | | |
|---|---|---|---|
| 9,756,564 B2 * | 9/2017 | Stojanovski | H04W 52/0216 |
| 2007/0093975 A1 * | 4/2007 | Hoogenboom | G06F 17/30861 |
| | | | 702/35 |
| 2011/0170420 A1 * | 7/2011 | Xi | H04L 5/001 |
| | | | 370/241 |
| 2014/0378081 A1 | 12/2014 | Xu et al. | |
| 2016/0073338 A1 * | 3/2016 | Kim | H04W 52/02 |
| | | | 370/311 |
| 2016/0112846 A1 * | 4/2016 | Siswick | H04B 17/27 |
| | | | 455/456.4 |
| 2016/0192292 A1 * | 6/2016 | Hoglund | H04W 52/0216 |
| | | | 370/311 |
| 2016/0242231 A1 | 8/2016 | Vajapeyam et al. | |
| 2016/0286385 A1 | 9/2016 | Ryu et al. | |
| 2016/0366680 A1 * | 12/2016 | Xu | H04W 72/048 |
| 2017/0273022 A1 * | 9/2017 | Kazmi | H04W 52/0216 |

* cited by examiner

DEEP SLEEP MODE ABORT MECHANISM FOR MACHINE-TYPE COMMUNICATION DEVICES

RELATED APPLICATION

This application claims priority under 35 U.S.C. § 119 to Indian Patent Application No. 201621017185, filed on May 18, 2016, the content of which is incorporated by reference herein in its entirety.

FIELD OF THE DISCLOSURE

Aspects of the present disclosure generally relate to wireless communication, and more particularly to techniques and apparatuses for a deep sleep mode abort mechanism for machine-type communication devices.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, a national, a regional, and even a global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method of wireless communication may include receiving sensor information from a sensor associated with the wireless communication device, wherein the wireless communication device is in a deep sleep mode when the sensor information is received; and deactivating the deep sleep mode, based at least in part on receiving the sensor information, to permit the wireless communication device to transmit or decode a network communication.

In some aspects, a device may include a memory and one or more processors operatively coupled to the memory. The one or more processors may be configured to receive sensor information from a sensor associated with the device, wherein the device is in a deep sleep mode when the sensor information is received; and deactivate the deep sleep mode, based at least in part on receiving the sensor information, to permit the device to transmit or decode a network communication.

In some aspects, a non-transitory computer-readable medium may store one or more instructions for wireless communication. The one or more instructions, when executed by one or more processors of a wireless communication device, may cause the one or more processors to receive sensor information from a sensor associated with the wireless communication device, wherein the wireless communication device is in a deep sleep mode when the sensor information is received; and deactivate the deep sleep mode, based at least in part on receiving the sensor information, to permit the wireless communication device to transmit or decode a network communication.

In some aspects, an apparatus for wireless communication may include means for receiving sensor information from a sensor associated with the apparatus, wherein the apparatus is in a deep sleep mode when the sensor information is received; and means for deactivating the deep sleep mode, based at least in part on receiving the sensor information, to permit the apparatus to transmit or decode a network communication.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
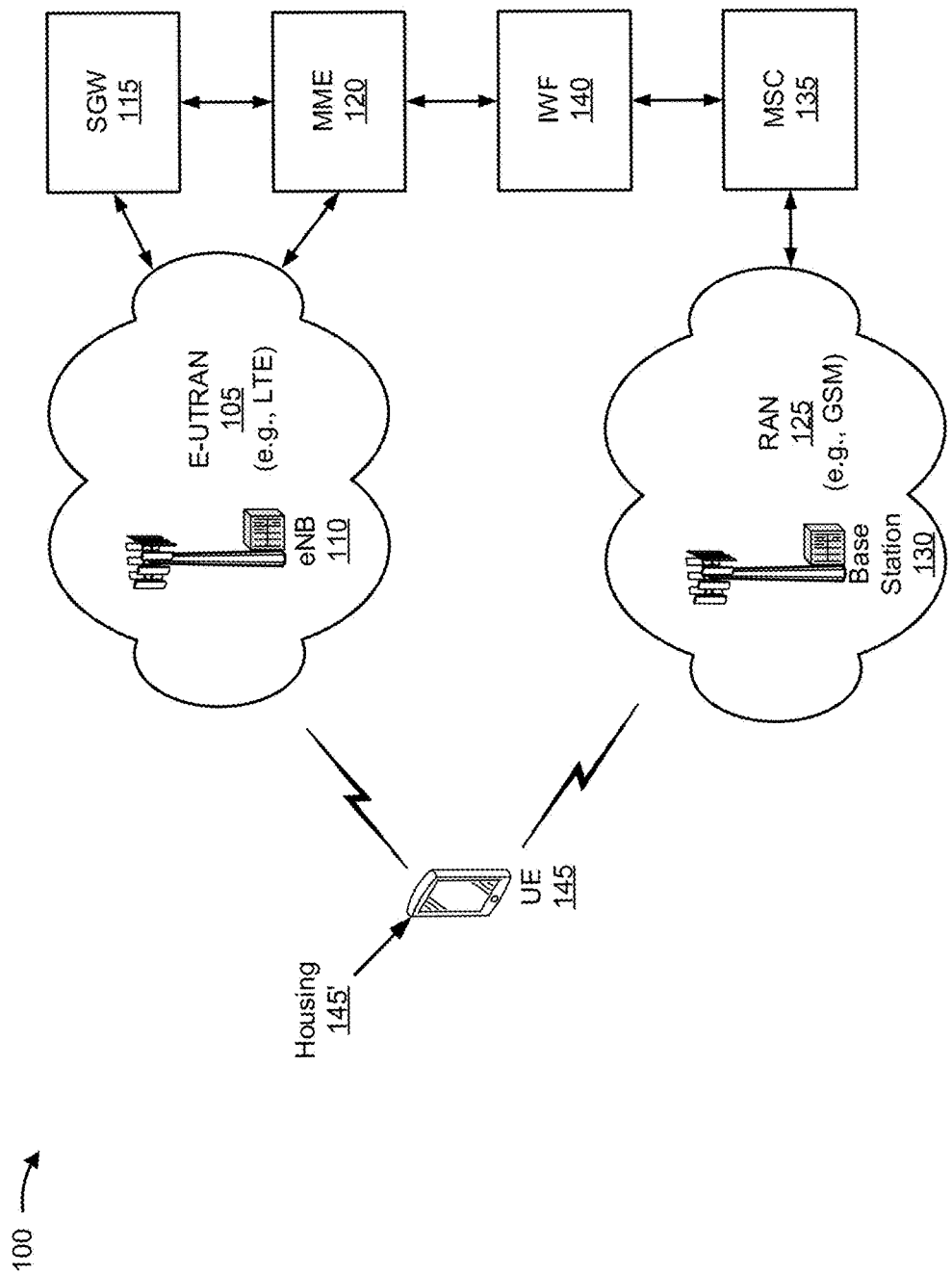
FIG. 1 is a diagram illustrating an example deployment in which multiple wireless networks have overlapping coverage, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Additionally, or alternatively, the techniques described herein may be used in connection with New Radio (NR), which may also be referred to as 5G. New Radio is a set of enhancements to the LTE mobile standard promulgated by the 3GPP. NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation.

FIG. 1 is a diagram illustrating an example deployment 100 in which multiple wireless networks have overlapping coverage, in accordance with various aspects of the present disclosure. As shown, example deployment 100 may include an evolved universal terrestrial radio access network (E-UTRAN) 105, which may include one or more evolved Node Bs (eNBs) 110, and which may communicate with other devices or networks via a serving gateway (SGW) 115 and/or a mobility management entity (MME) 120. As further shown, example deployment 100 may include a radio access network (RAN) 125, which may include one or more base stations 130, and which may communicate with other devices or networks via a mobile switching center (MSC) 135 and/or an inter-working function (IWF) 140. As further shown, example deployment 100 may include one or more user equipment (UEs) 145 capable of communicating via E-UTRAN 105 and/or RAN 125.

E-UTRAN 105 may support, for example, LTE or another type of RAT. E-UTRAN 105 may include eNBs 110 and other network entities that can support wireless communication for UEs 145. Each eNB 110 may provide communication coverage for a particular geographic area. The term "cell" may refer to a coverage area of eNB 110 and/or an eNB subsystem serving the coverage area on a specific frequency channel.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for UEs 145 located within a geographic region served by MME 120 of E-UTRAN 105. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, GSM or another type of RAT. RAN 125 may include base stations 130 and other network entities that can support wireless communication for UEs 145. MSC 135 may communicate with RAN 125 and may perform various functions, such as voice services, routing for circuit-switched calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a same RAT). In some aspects, E-UTRAN 105 and RAN 125 may use the same frequency and/or the same RAT to communicate with UE 145. In some aspects, E-UTRAN 105 and RAN 125 may use different frequencies and/or RATs to communicate with UEs 145. As used herein, the term base station is not tied to any particular RAT, and may refer to an eNB (e.g., of an LTE network) or another type of base station associated with a different type of RAT.

In general, any number of wireless networks may be deployed in a given geographic area. Each wireless network may support a particular RAT and may operate on one or more frequencies. A RAT may also be referred to as a radio technology, an air interface, etc. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communication device, a subscriber unit, a station, and/or the like. UE 145 may be a cellular phone, a personal digital assistant (PDA), a wireless modem, a wireless communication device, a handheld device, a laptop computer, a cordless phone, a wireless local loop (WLL) station, and/or the like. UE 145 may be included inside a housing 145' that houses components of UE 145, such as processor components, memory components, display components (i.e., a screen), and/or the like.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, if necessary. UE 145 may then operate in a connected mode to actively communicate with the serving network. Alternatively, UE 145 may operate in an idle mode and camp on the serving network if active communication is not required by UE 145.

UE 145 may operate in the idle mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle mode, such as a neighbor list included in a system information block type 5 (SIB 5) provided by an eNB of a RAT on which UE 145 is camped. Additionally, or alternatively, UE 145 may generate a neighbor list. A neighbor list may include information identifying one or more frequencies, at which one or more RATs may be accessed, priority information associated with the one or more RATs, and/or the like.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
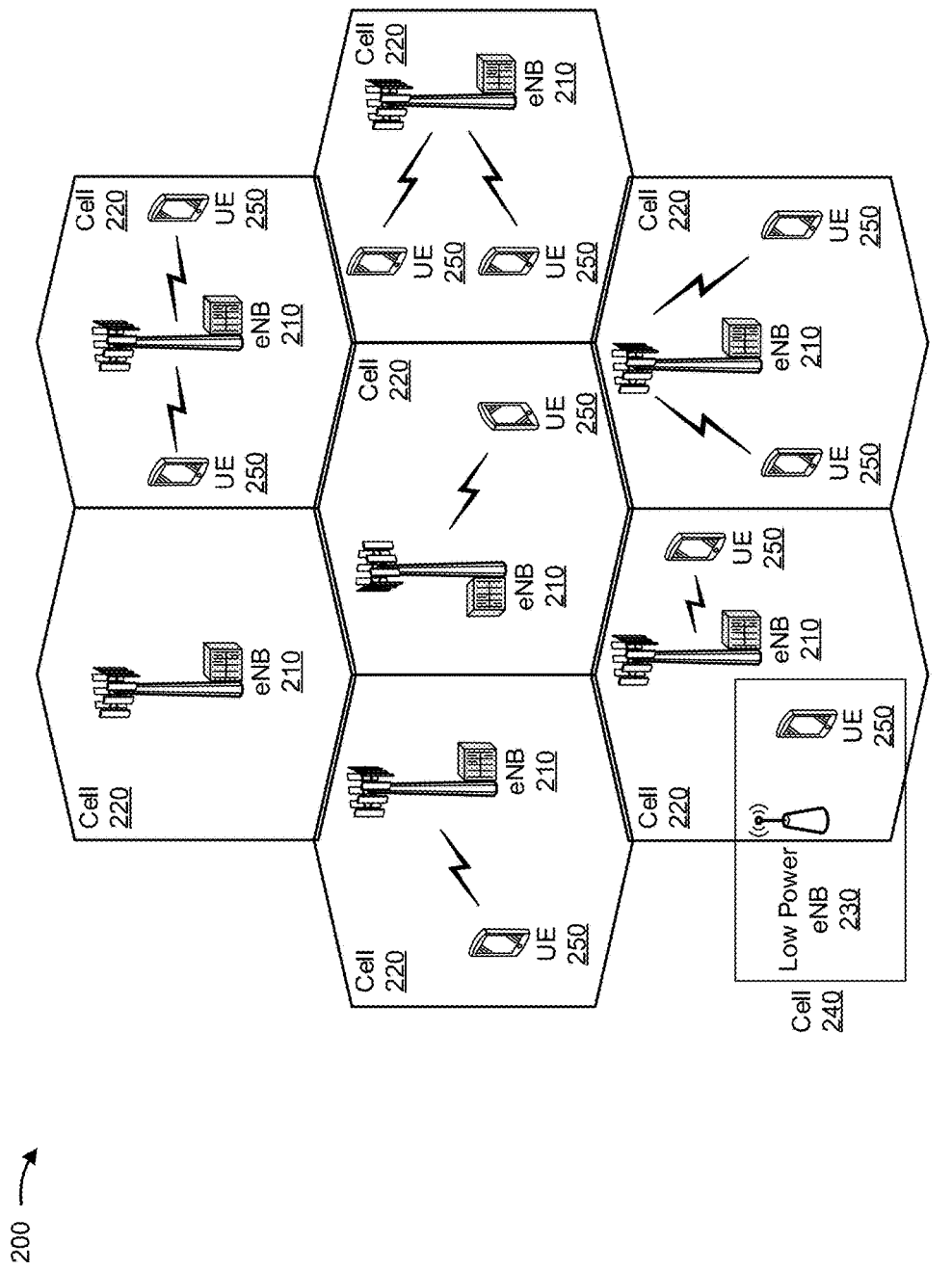
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more eNBs 210 (sometimes referred to as "base stations" herein) that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). In some cases, the terms base station and eNB may be used interchangeably, and a base station, as used herein, is not tied to any particular RAT. UE 145, 250 may correspond to UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 210 may have multiple antennas supporting MIMO technology. The use of MIMO technology enables eNBs 210 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 210 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
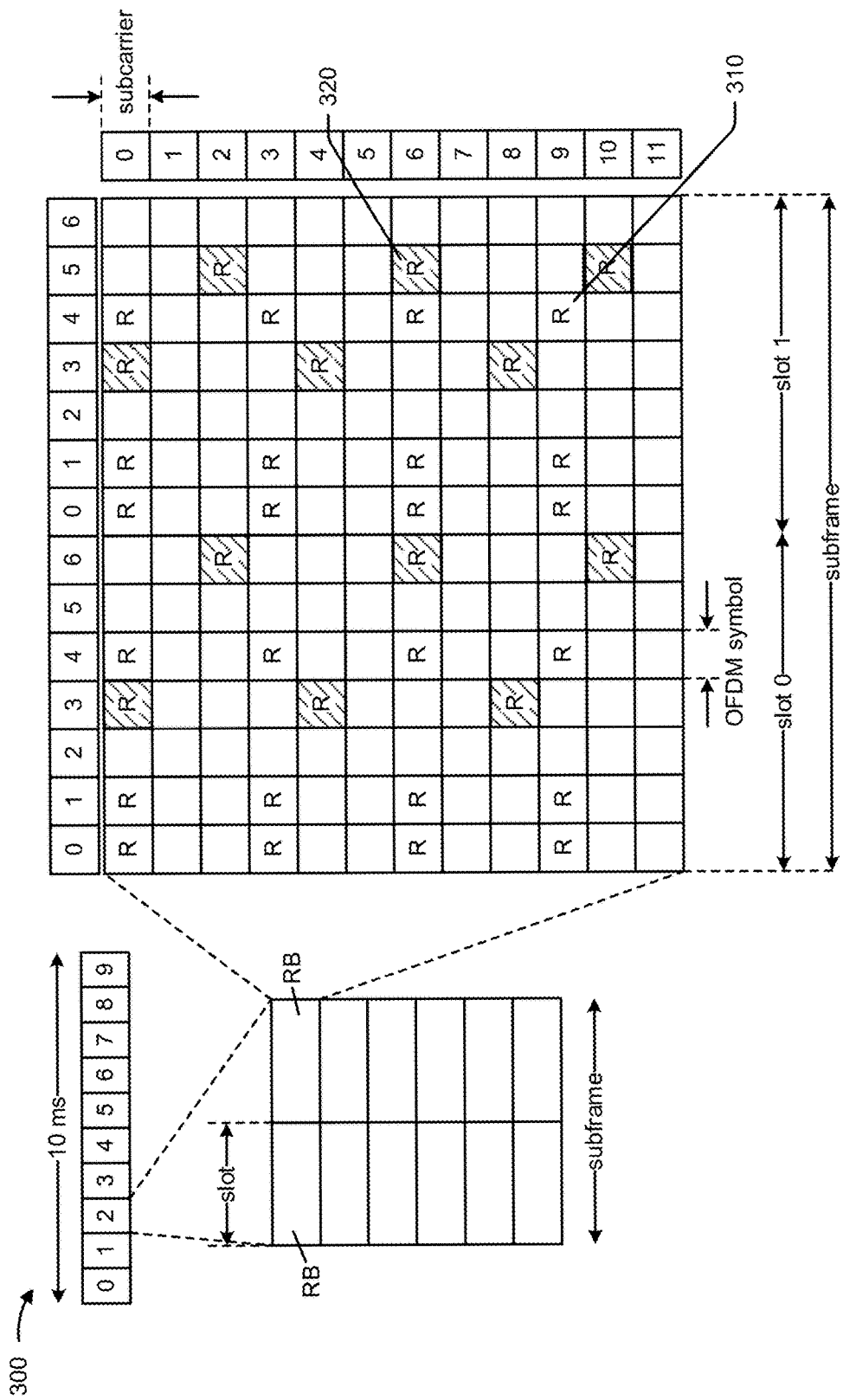
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized subframes with indices of 0 through 9. Each subframe may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

As indicated above, FIG. 3 is provided as an example. Other examples are possible and may differ from what was described above in connection with FIG. 3.

Figure 4:
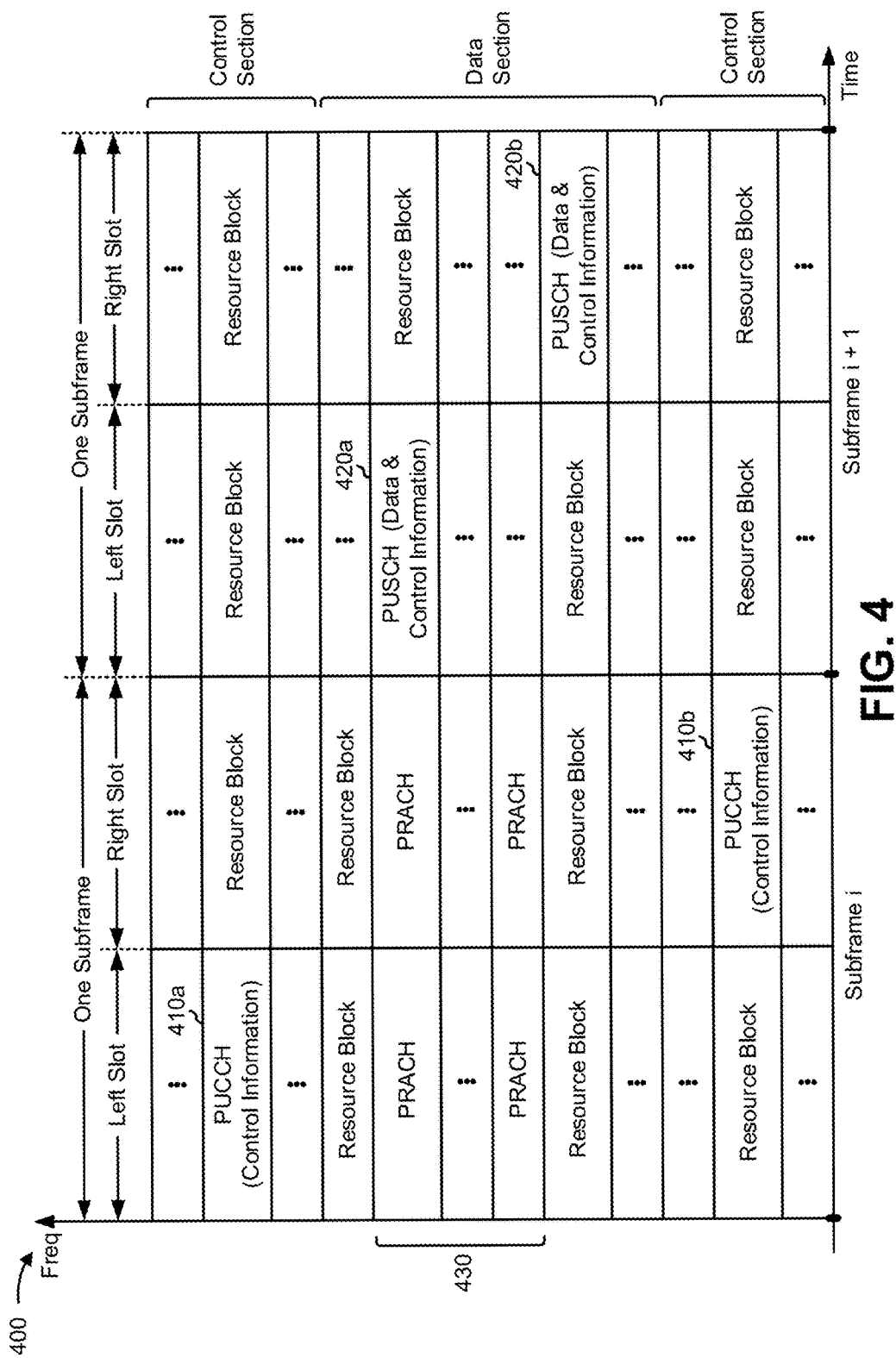
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

As indicated above, FIG. 4 is provided as an example. Other examples are possible and may differ from what was described above in connection with FIG. 4.

Figure 5:
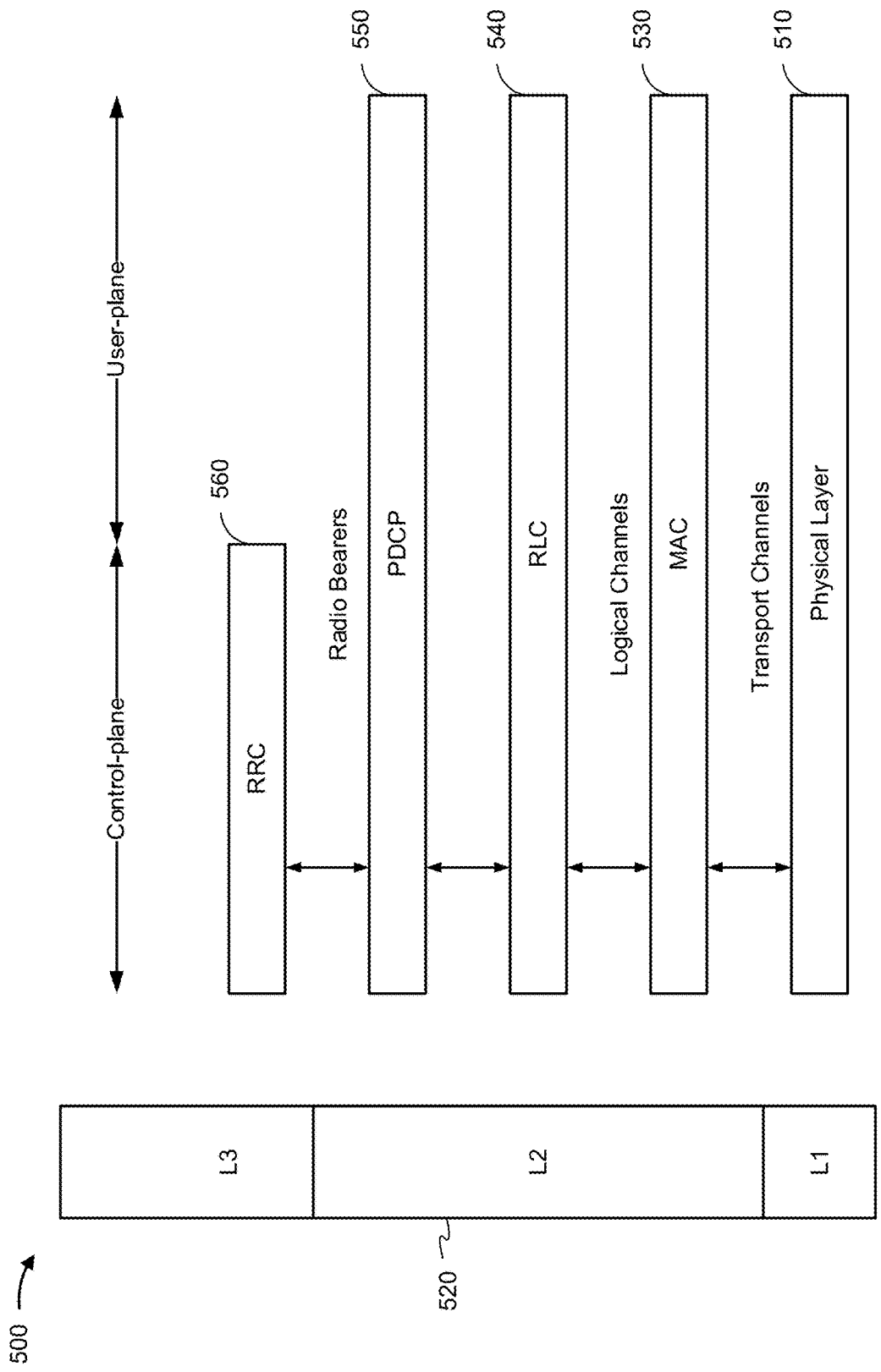
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes, for example, a media access control (MAC) sublayer 530, a radio link control (RLC) sublayer 540, and a packet data convergence protocol (PDCP) sublayer 550, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., far end UE, server, etc.).

The PDCP sublayer 550 provides retransmission of lost data in handover. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
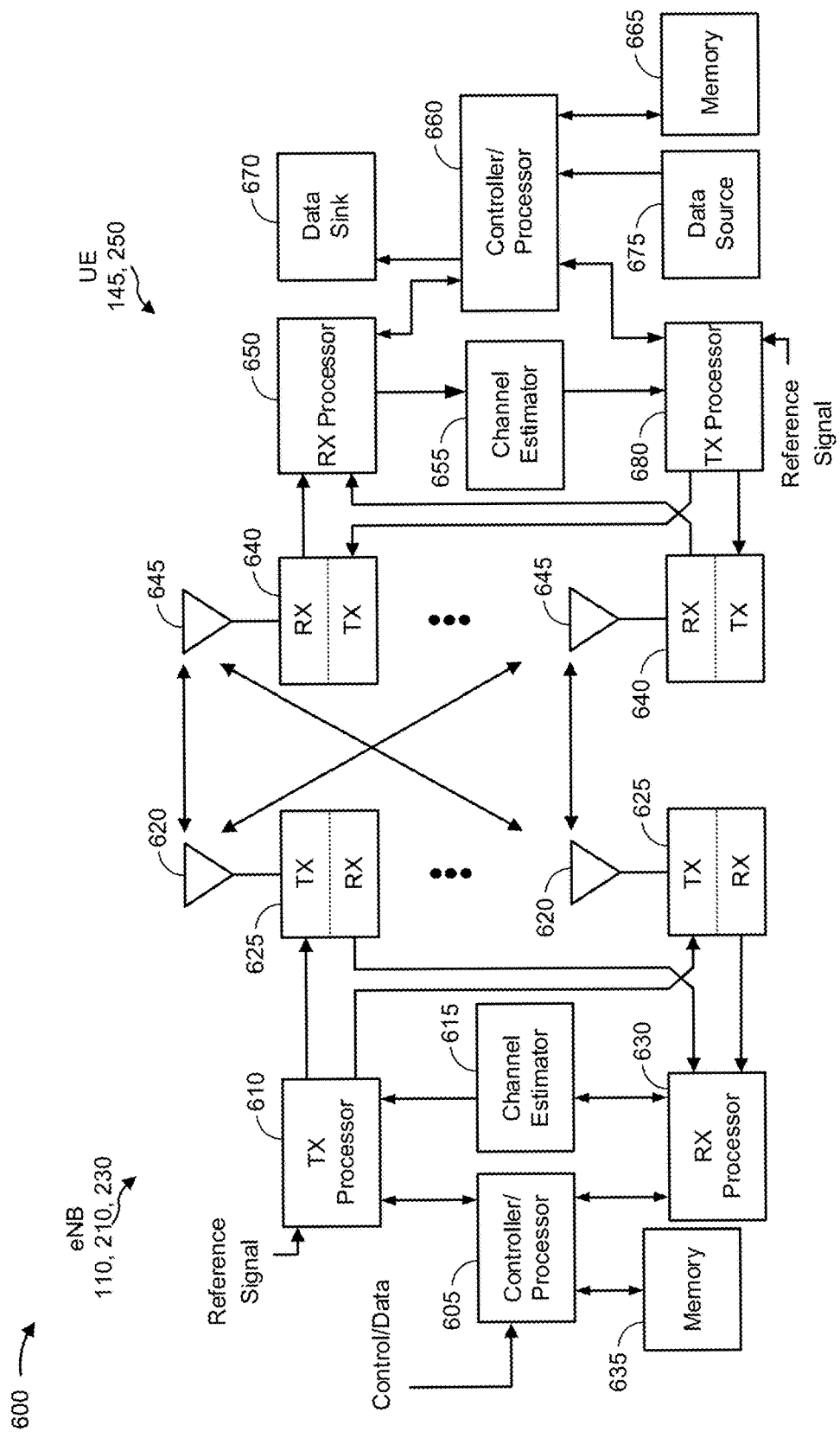
FIG. 6 is a diagram illustrating example components of an evolved Node B and a user equipment in an access network, in accordance with various aspects of the present disclosure.

FIG. 6 is a diagram illustrating example components 600 of eNB 110, 210, 230 and UE 145, 250 in an access network, in accordance with various aspects of the present disclosure. As shown in FIG. 6, eNB 110, 210, 230 may include a controller/processor 605, a TX processor 610, a channel estimator 615, an antenna 620, a transmitter 625TX, a receiver 625RX, an RX processor 630, and a memory 635.

As further shown in FIG. 6, UE 145, 250 may include a receiver RX, for example, of a transceiver TX/RX 640, a transmitter TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based, at least in part, on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter TX, for example, of transceiver TX/RX 625. Each such transmitter TX modulates an RF carrier with a respective spatial stream for transmission.

At the UE 145, 250, each receiver RX, for example, of a transceiver TX/RX 640 receives a signal through its respective antenna 645. Each such receiver RX recovers information modulated onto an RF carrier and provides the information to the receiver (RX) processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using an acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX, for example, of transceiver TX/RX 640 modulates an RF carrier with a respective spatial stream for transmission.

The UL transmission is processed at the eNB 110, 210, 230 in a manner similar to that described in connection with the receiver function at the UE 145, 250. Each receiver RX, for example, of transceiver TX/RX 625 receives a signal through its respective antenna 620. Each receiver RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the control/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

One or more components of UE 145, 250 may be configured to perform a deep sleep mode abort mechanism for machine-type communication devices, as described in more detail elsewhere herein. For example, the controller/processor 660 and/or other processors and modules of UE 145, 250 may perform or direct operations of, for example, process 900 of FIG. 9, process 1300 of FIG. 13, and/or other processes as described herein. In some aspects, one or more of the components shown in FIG. 6 may be employed to perform example process 900, example process 1300, and/or other processes for the techniques described herein.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

A user equipment (UE) may use a low power mode, such as an extended paging cycle (e.g., a hyper system frame number (H-SFN) cycle or an extended discontinuous reception (E-DRX) cycle), a power saving mode (PSM), or a similar approach, to conserve battery power of the UE. For example, a category M1 UE (e.g., a machine-type communication (MTC) device, an Internet of Things (IoT) device, a machine-to-machine (M2M) device, etc.) may enter a deep sleep mode (e.g., based at least in part on an H-SFN cycle, an E-DRX cycle, or a PSM cycle) to extend battery life of the UE.

When the UE is in a deep sleep mode or power saving mode, the UE may not decode data received from the network. The UE may only decode data received during an intermittent awake period of the UE. For example, the UE may be unreachable by the network during the deep sleep mode or power saving mode, which could be as much as 43 minutes for a Cat M1 UE or as much as 2.9 hours for a Cat NB-IoT UE. Thus, the UE may fail to decode information received during the deep sleep mode or power saving mode, such as an emergency notification.

Aspects described herein may receive sensor information collected by a sensor of the UE that is kept active during a deep sleep mode of the UE (e.g., a PSM, a deep sleep mode of an H-SFN cycle, or a deep sleep mode of an E-DRX cycle), and may deactivate the deep sleep cycle based at least in part on the sensor information (e.g., based at least in part on determining that the sensor information satisfies a threshold). This may permit the UE to receive communications that would otherwise not be received or decoded due to the UE being in a deep sleep mode associated with PSM, H-SFN, or E-DRX.

In some aspects, as described in connection with FIGS. 7-11, a UE may receive the sensor information while in a deep sleep mode associated with PSM. In such a case, the UE may cause PSM to be deactivated by transmitting a tracking area update (TAU) that does not identify a PSM timer value. The network (e.g., a base station associated with the UE) may deactivate PSM for the UE based at least in part on the TAU.

Additionally, or alternatively, as described in connection with FIGS. 12-15, a UE may receive the sensor information while in a deep sleep mode associated with an H-SFN cycle or an E-DRX cycle. In such a case, the UE may deactivate the deep sleep mode and may activate a light sleep mode associated with a normal DRX paging cycle configuration (e.g., paging every 32 frames, 64 frames, 128 frames, 256 frames, etc.). The UE may receive information, such as an emergency notification, once the normal DRX paging cycle configuration is active (e.g., due to a retransmission of undecoded information received in the deep sleep mode or a transmission of information to be received by the UE). The UE may re-enter the deep sleep mode after reception of the information is complete.

Figure 7:
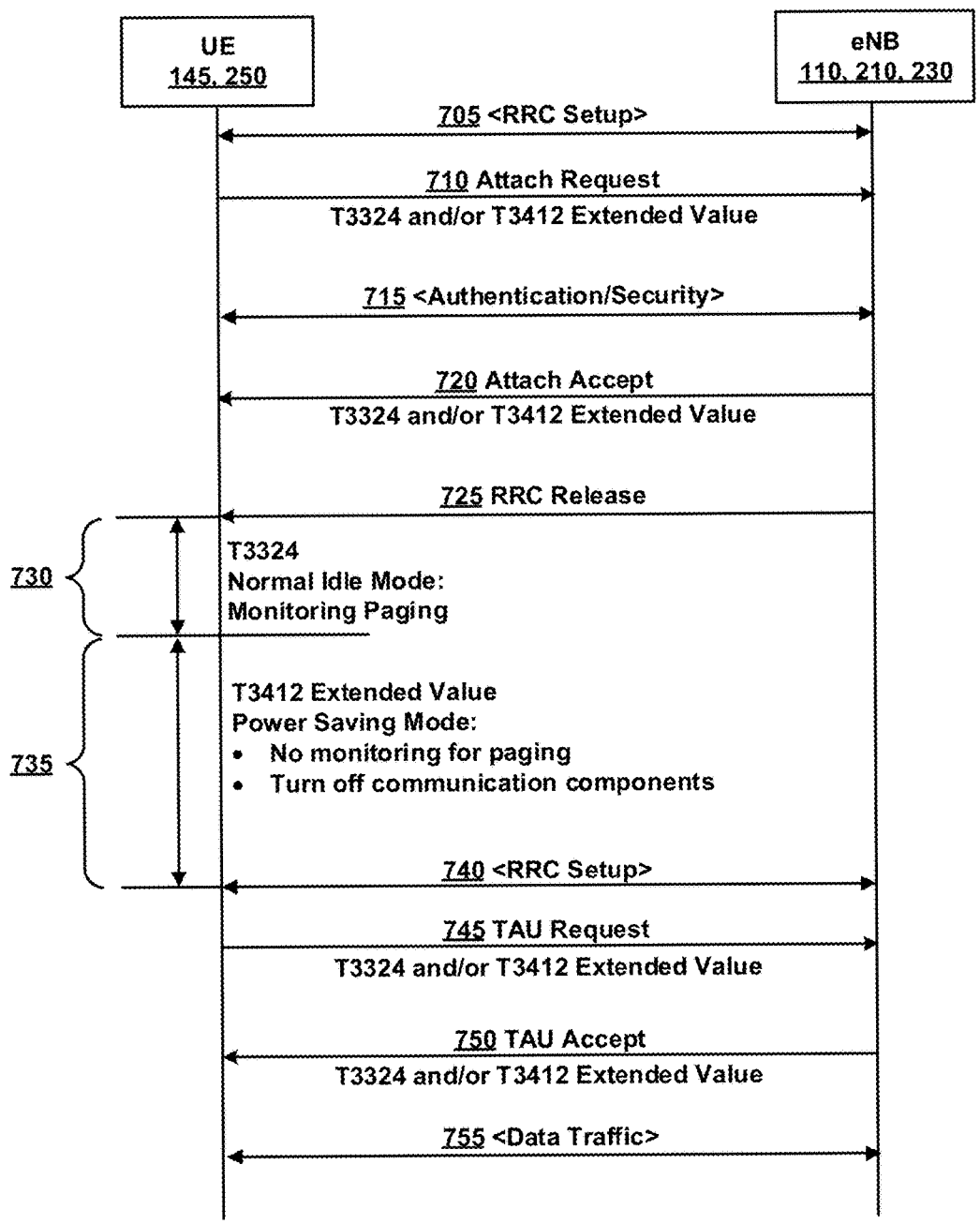
FIG. 7 is a diagram illustrating an example system configured to enable a power saving mode abort mechanism for machine-type communication devices, in accordance with various aspects of the present disclosure.

FIG. 7 is a diagram illustrating an example system 700 configured to enable a power saving mode abort mechanism for machine-type communication devices. As shown in FIG. 7, example system 700 may include a UE 145, 250 and an eNB 110, 210, 230. In some aspects, the UE 145, 250 may be a category M1 UE.

As shown in FIG. 7, and by reference number 705, the UE 145, 250 and the eNB 110, 210, 230 may communicate to set up a radio resource control (RRC) connection. For example, the UE 145, 250 and the eNB 110, 210, 230 may exchange RRC messages to establish an RRC connection. As shown by reference number 710, the UE 145, 250 may transmit an attach request message to the eNB 110, 210, 230. In some aspects, the attach request message may include proposed values for a power saving mode (PSM) timer, shown as T3324, and an extended TAU timer, shown as T3412 extended value. The PSM timer may indicate a time period after which the UE 145, 250 is permitted to enter a power saving mode after performing or completing a handshake procedure with the eNB 110, 210, 230 (e.g., after receiving an RRC release message from the eNB 110, 210, 230). The extended TAU timer may indicate a first time period during which communications between the UE 145, 250 and the eNB 110, 210, 230 are deactivated. In some aspects, the first time period may be referred to herein as a deep sleep mode of the UE 145, 250. Communications between the UE 145, 250 and the eNB 110, 210, 230 may be activated during a second time period, during which time the UE 145, 250 may report information, such as sensor information, to the eNB 110, 210, 230.

As shown by reference number 715, the UE 145, 250 and the eNB 110, 210, 230 may communicate to perform authentication and/or security procedures. Additionally, or alternatively, the UE 145, 250 and/or the eNB 110, 210, 230 may negotiate a value for the PSM timer and/or the extended TAU timer. As shown by reference number 720, the eNB 110, 210, 230 may transmit an attach accept message to the UE 145, 250. The attach accept message may include negotiated or pre-determined values for the PSM timer and the extended TAU timer. The UE 145, 250 (e.g., a PSM component 1006 (FIG. 10) of the UE 145, 250) may be configured using these values. As shown by reference number 725, the eNB 110, 210, 230 may release an RRC connection with the UE 145, 250, and the UE 145, 250 may enter a normal idle mode (e.g., RRC-Idle) based at least in part on the RRC connection being released.

As shown by reference number 730, the UE 145, 250 may be in the idle mode for a time period indicated by the PSM timer (e.g., the T3324 timer). During this time period, the UE 145, 250 (e.g., the PSM component 1006) may keep components needed for communication with the eNB 110, 210, 230, such as an RF component, a cellular modem, a reception component 1004 (FIG. 10), a transmission component 1012 (FIG. 10), and/or the like, powered on. Additionally, or alternatively, the UE 145, 250 (e.g., the PSM component 1006) may periodically activate or deactivate these components according to a discontinuous reception (DRX) cycle. During this time period, the UE 145, 250 may be reachable by the network using a paging procedure, and the UE 145, 250 may monitor for paging. For example, the UE 145, 250 may be in a light sleep mode during part of, or all of, the time period indicated by the PSM timer.

As shown by reference number 735, after expiration of the PSM timer, the UE 145, 250 may enter a power saving mode or a deep sleep mode for a time period indicated by the extended TAU timer. For example, the UE 145, 250 may enter the power saving mode based at least in part on performing a handshake procedure with the eNB 110, 210, 230 and after expiration of the PSM timer. The power saving mode may cause communications between the UE 145, 250 and the network (e.g., eNB 110, 210, 230) to periodically deactivate during a first time period and activate during a second time period. During the first time period, the UE 145, 250 (e.g., the PSM component 1006) may power down components needed for communication with the eNB 110, 210, 230, such as an RF component and/or a cellular modem. Additionally, or alternatively, the UE 145, 250 (e.g., the PSM component 1006) may prevent periodic activation or deactivation of these components that would normally occur during the idle mode according to a DRX cycle. During the first time period, the UE 145, 250 may be unreachable by the network, and the UE 145, 250 may not monitor for paging.

During the time period when the UE 145, 250 is in the power saving mode (e.g., the deep sleep mode), the UE 145, 250 may receive urgent information, such as sensor information received from one or more sensors associated with the UE 145, 250. However, the UE 145, 250 may not be permitted to report such urgent information to the network because the extended TAU timer has not yet expired. In this case, the UE 145, 250 may remain in the power saving mode until the extended TAU timer has expired and, upon expiration of the extended TAU timer, may communicate with the eNB 110, 210, 230 to set up an RRC connection, may send a TAU request message to the eNB 110, 210, 230 (e.g., that may include proposed values for the PSM timer and/or the extended TAU timer), and may receive a TAU accept message from the eNB 110, 210, 230 (e.g., that may include negotiated or pre-determined values for the PSM timer and/or the extended TAU timer), as shown by reference numbers 740, 745, and 750. The UE 145, 250 may then report the urgent information to the eNB 110, 210, 230 as data traffic, as shown by reference number 755. However, this may create an undesirable delay associated with reporting of urgent information. To mitigate this delay, the UE 145, 250 may implement aspects described below in connection with FIG. 8.

As indicated above, FIG. 7 is provided as an example. Other examples are possible and may differ from what was described in connection with FIG. 7.

Figure 8:
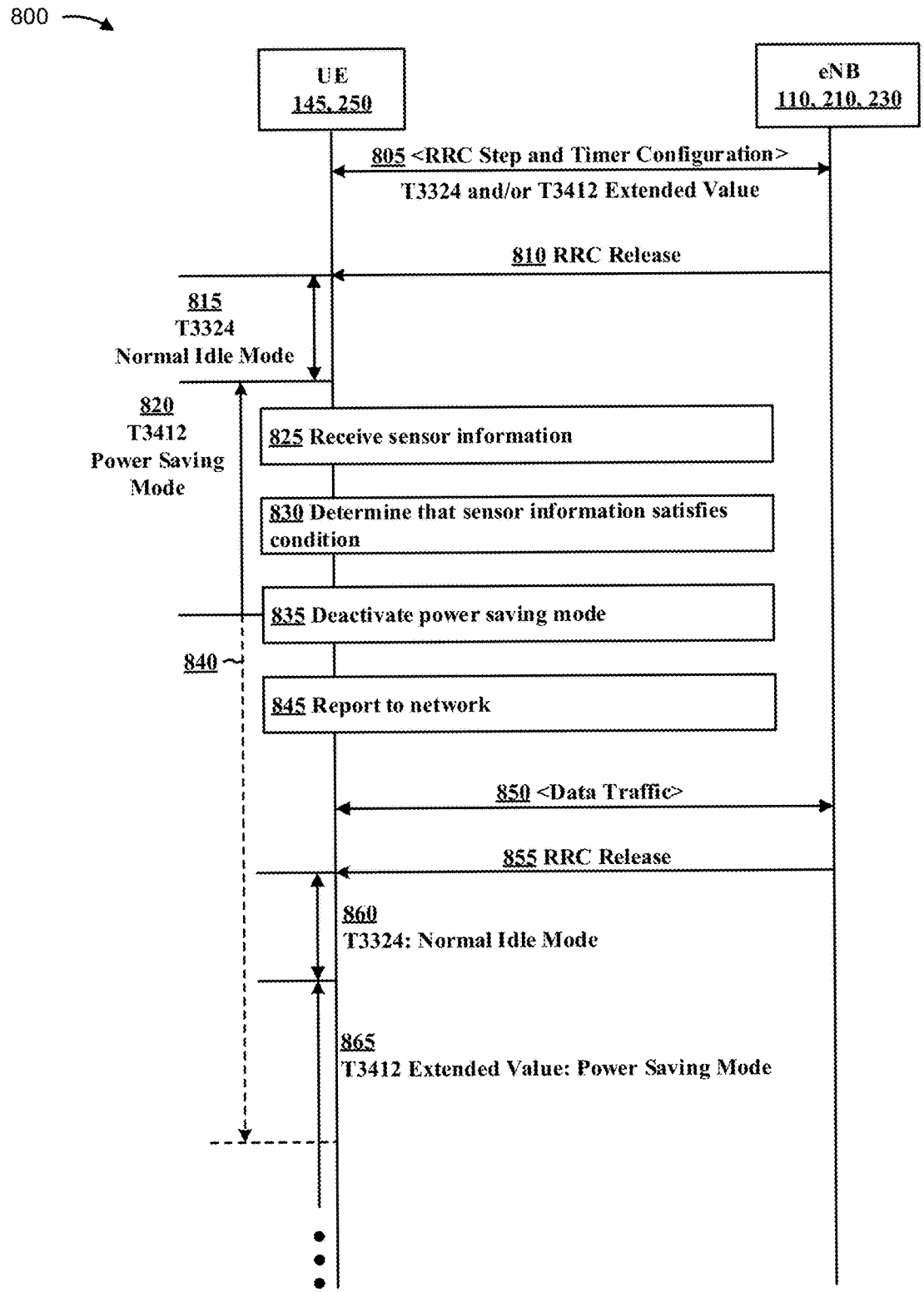
FIG. 8 is a diagram illustrating another example system configured to enable a deep sleep mode abort mechanism for machine-type communication devices, in accordance with various aspects of the present disclosure.

FIG. 8 is a diagram illustrating another example system 800 configured to enable a deep sleep mode abort mechanism for machine-type communication devices. As shown in FIG. 8, example system 800 may include a UE 145, 250 and an eNB 110, 210, 230. In some aspects, the UE 145, 250 may be a category M1 UE.

As shown in FIG. 8, and by reference number 805, the UE 145, 250 and the eNB 110, 210, 230 may communicate to set up a radio resource control (RRC) connection and configure a PSM timer and an extended TAU timer, as described above in connection with FIG. 7 (e.g., reference numbers 705-720). As shown by reference number 810, the eNB 110, 210, 230 may release the RRC connection with the UE 145, 250, and the UE 145, 250 may enter a normal idle mode (e.g., RRC-Idle). As shown by reference number 815, the UE 145, 250 may be in the idle mode for a time period indicated by the PSM timer (e.g., the T3324 timer), as described above in connection with FIG. 7 (e.g., reference number 730).

As shown by reference number 820, after expiration of the PSM timer, the UE 145, 250 (e.g., the PSM component 1006 of the UE 145, 250) may enter a power saving mode (e.g., a deep sleep mode) for a time period indicated by the extended TAU timer, as described above in connection with FIG. 7 (e.g., reference number 735). For example, the power saving mode may cause communications between the UE 145, 250 and the network (e.g., eNB 110, 210, 230) to periodically deactivate during a first time period and activate during a second time period. As shown by reference number 825, during the first time period when the UE 145, 250 is in the power saving mode, the UE 145, 250 may receive sensor information (e.g., from a sensor component 1008 and/or while the communications are deactivated). The sensor information may include information measured by one or more sensors and/or derived from a measurement of one or more sensors associated with the UE 145, 250. For example, the one or more sensors may be included in the UE 145, 250 and/or in communication with the UE 145, 250. A sensor may provide one or more measurements associated with an operating environment of the UE 145, 250, such as an operating condition of the UE 145, 250, an environmental condition of an environment in which the UE 145, 250 is located, or the like.

For example, the sensor information may include a temperature measurement (e.g., an operating temperature of the UE 145, 250 or a temperature of an environment in which the UE 145, 250 is located), a pressure measurement (e.g., barometric pressure), a moisture measurement (e.g., humidity, water level, water vapor, etc.), a weather-related measurement (e.g., wind speed, vibrations of an earthquake, etc.), a traffic-related measurement (e.g., a measurement of traffic density determined via image processing), a sound measurement (e.g., a noise level, a decibel level, etc.), a speed measurement, a location determination (e.g., a change in location), a signal received from another device (e.g., a remote control, a key fob, and/or the like), and/or the like.

As shown by reference number 830, the UE 145, 250 (e.g., a determining component 1010 of the UE 145, 250) may determine whether the sensor information satisfies a condition. For example, the UE 145, 250 may compare the sensor information to a threshold to determine whether the sensor information satisfies the condition. In some aspects, the UE 145, 250 may be configured to store one or more threshold values in a look-up table. For example, the look-up table may store threshold values for different types of sensor information (e.g., a temperature measurement, a pressure measurement, etc.) The UE 145, 250 may use the look-up table to determine whether the sensor information satisfies one or more thresholds.

If the condition is not satisfied, then the UE 145, 250 may continue to operate in the power saving mode (e.g., the deep sleep mode). However, if the condition is satisfied, then the UE 145, 250 (e.g., the PSM component 1006) may deactivate the power saving mode, as shown by reference number 835. For example, the UE 145, 250 may activate one or more communication components to communication with the eNB 110, 210, 230. As shown by reference number 840, the UE 145, 250 may deactivate the power saving mode, prior to expiration of the first time period, based at least in part on determining that the condition is satisfied. In some aspects, the first time period may be represented by a periodic TAU timer, such as an extended TAU timer, and the UE 145, 250 may deactivate the power saving mode prior to expiration of the periodic TAU timer. As shown by reference number 845, the UE 145, 250 may report to the network based at least in part on deactivating the power saving mode. For example, the UE 145, 250 may report the sensor information, data derived from the sensor information, a TAU message (e.g., that may not include the PSM timer and/or the extended TAU timer), an alert, and/or the like. Such reporting may occur as an exchange of data traffic, as shown by reference number 850. In this way, the UE 145, 250 may interrupt a power saving mode, prior to expiration of an extended TAU timer, to report urgent information to the network, which may reduce delays in reporting urgent information.

As shown by reference number 855, the eNB 110, 210, 230 may release an RRC connection with the UE 145, 250. The UE 145, 250 (e.g., the PSM component 1006) may reset the PSM timer and/or the periodic TAU timer, such as the extended TAU timer, and may enter a normal idle mode (e.g., RRC-Idle), as shown by reference number 860. After expiration of the PSM timer, the UE 145, 250 may enter the power saving mode, as shown by reference number 865. In this way, the UE 145, 250 may conserve battery power by using a power saving mode with an extended TAU timer, while also reducing delay in reporting urgent information obtained by the UE 145, 250 while in the power saving mode.

As indicated above, FIG. 8 is provided as an example. Other examples are possible and may differ from what was described in connection with FIG. 8.

Figure 9:
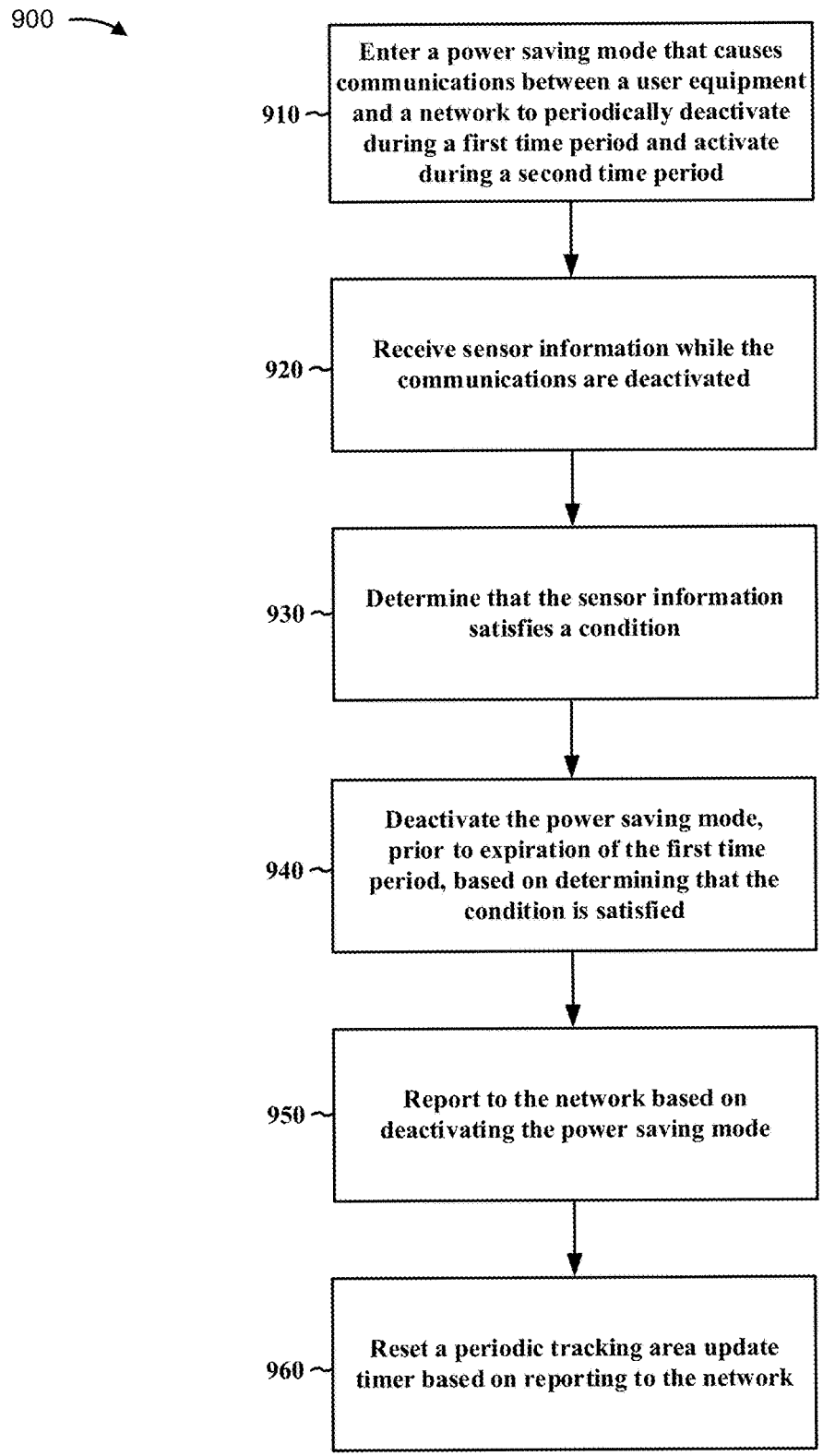
FIG. 9 is a flow chart of a method of wireless communication, in accordance with various aspects of the present disclosure.

FIG. 9 is a flow chart 900 of a method of wireless communication. The method may be performed by a UE (e.g., the UE 145, 250 and/or an apparatus 1002/1002', described in more detail below).

At 910, the UE may enter a power saving mode that causes communications between the UE and a network to periodically deactivate during a first time period and activate during a second time period. For example, the first time period may be represented using a periodic tracking area update timer (e.g., an extended tracking area update timer). The UE may be unreachable by the network during the first time period. For example, the first time period may correspond to a deep sleep mode of the UE. In some aspects, the UE may perform a handshake procedure with the network, and may enter the power saving mode based at least in part on performing the handshake procedure and after expiration of a power saving mode timer. In some aspects, the UE may be a machine-type communication device.

At 920, the UE may receive sensor information while the communications are deactivated. For example, the sensor information may include a temperature measurement, a pressure measurement, a moisture measurement, a weather-related measurement, a traffic-related measurement, a sound measurement, a speed measurement, a location determination, or any combination thereof.

At 930, the UE may determine that the sensor information satisfies a condition. For example, the UE may compare the sensor information to a threshold value to determine that the sensor information satisfies the condition.

At 940, the UE may deactivate the power saving mode, prior to expiration of the first time period, based at least in part on determining that the condition is satisfied. For example, the UE may deactivate a deep sleep mode, may switch from a deep sleep mode to a light sleep mode, and/or the like.

At 950, the UE may report to the network based at least in part on deactivating the power saving mode. For example, the UE may report a tracking area update message, an alert, the sensor information, data derived from the sensor information, or any combination thereof.

At 960, the UE may reset a periodic tracking area update timer based at least in part on reporting to the network. For example, the UE may reset the periodic tracking area update timer (e.g., the extended tracking area update timer) after reporting to the network.

Although FIG. 9 shows example blocks of a method of wireless communication, in some aspects, the method may include additional blocks, fewer blocks, different blocks, or differently arranged blocks than those shown in FIG. 9. Additionally, or alternatively, two or more blocks shown in FIG. 9 may be performed in parallel.

Figure 10:
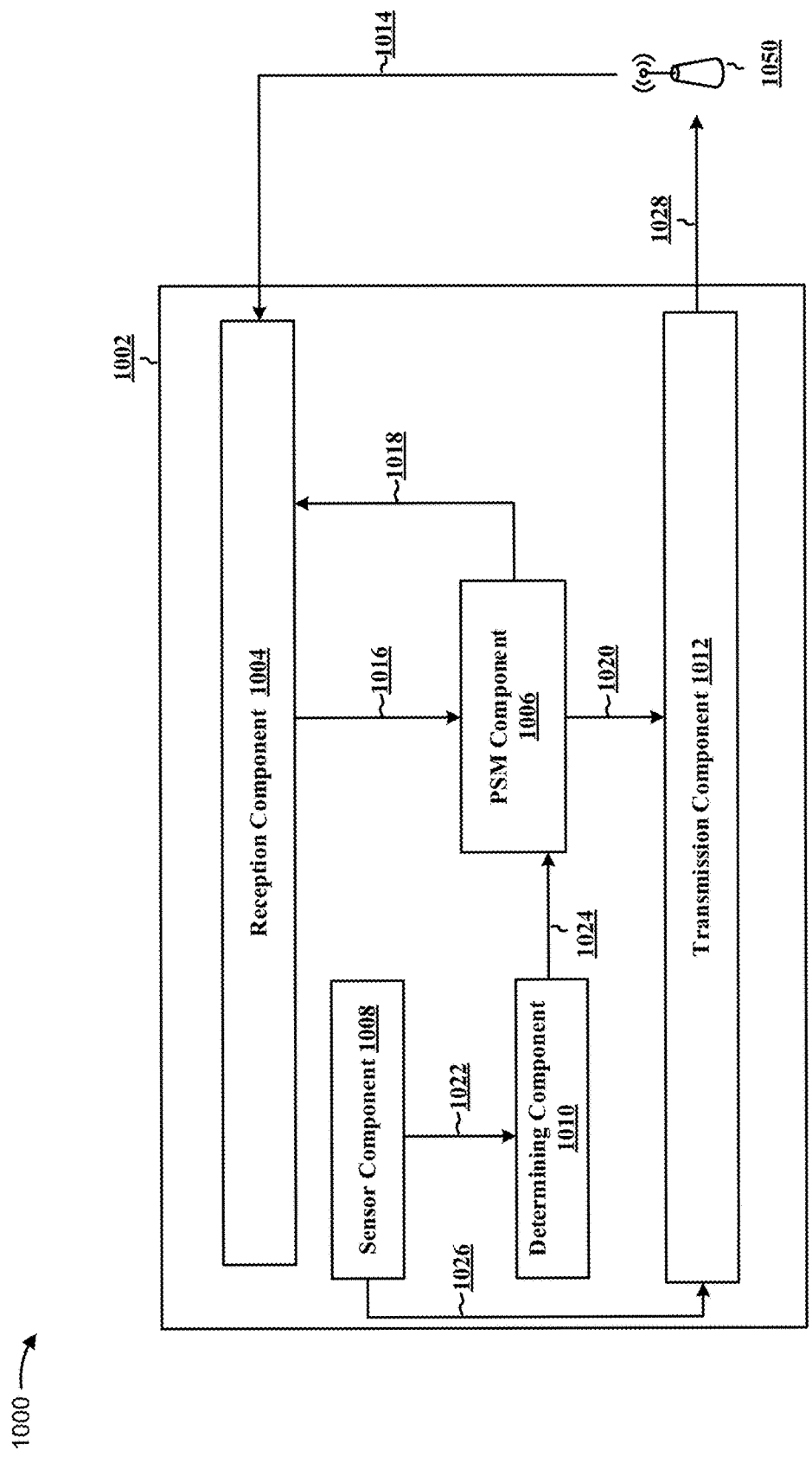
FIG. 10 is a conceptual data flow diagram illustrating the data flow between different modules/means/components in an example apparatus, in accordance with various aspects of the present disclosure.

FIG. 10 is a conceptual data flow diagram 1000 illustrating the data flow between different modules/means/components in an example apparatus 1002. In some aspects, the apparatus 1002 may be a UE (e.g., the UE 145, 250). As shown, the apparatus 1002 may include a reception component 1004, a PSM component 1006, a sensor component 1008, a determining component 1010, and a transmission component 1012. In some aspects, components 1004 through 1012 and/or other components may be software components, hardware components, a combination of software components and firmware components, and/or the like. For example, a UE may implement components 1004 through 1012 and/or other modules as software components of a processing system, such as a baseband processor of the UE, an application processor of the UE, an RX processor 650 of the UE, a TX processor 680 of the UE, a controller/processor 660 of the UE, and/or the like. Additionally, or alternatively, components 1004 through 1012 may be implemented in other ways than as described herein.

The reception component 1004 may receive data 1014, which may include one or more messages from an eNB 1050 (e.g., which may correspond to one or more of the eNBs 110, 210, 230). For example, the reception component 1004 may receive one or more messages described in connection with FIG. 7 and/or FIG. 8, such as an attach accept message that includes a PSM timer and/or an extended TAU timer. As shown, the reception component 1004 may provide data 1014 (e.g., which may be processed by the reception component 1004) as output to the PSM component 1006 (e.g., as data 1016).

The PSM component 1006 may receive data 1016 from the reception component 1004. Based at least in part on data 1016, the PSM component 1006 may configure, store, and/or use one or more timers, such as a PSM timer or an extended TAU timer. The PSM component 1006 may enter a power saving mode or deep sleep mode based at least in part on the one or more timers. For example, the PSM component 1006 may provide an instruction to the reception component 1004 (e.g., as data 1018) to cause the reception component 1004 to be powered off, and/or may provide an instruction to the transmission component 1012 (e.g., as data 1020) to cause the transmission component 1012 to be powered off.

The sensor component 1008 may measure and/or receive sensor information, and may provide the sensor information to the determining component 1010 (e.g., as data 1022). The determining component 1010 may receive the sensor information, and may determine that the sensor information satisfies a condition. The determining component 1010 may provide an indication (e.g., as data 1024), to the PSM component 1006, to indicate that the sensor information satisfies the condition. The PSM component 1006 may deactivate the power saving mode based at least in part on this indication. For example, the PSM component 1006 may provide an instruction to the reception component 1004 (e.g., as data 1018) to cause the reception component 1004 to be powered on, and/or may provide an instruction to the transmission component 1012 (e.g., as data 1020) to cause the transmission component 1012 to be powered on.

As further shown, the sensor component 1008 may provide sensor information (e.g., as data 1026) to the transmission component 1012. The transmission component 1012 may report data 1028 to the eNB 1050. Data 1028 may include, for example, the sensor information, data derived from the sensor information, an alert, a TAU message, or any combination thereof. In some aspects, the apparatus 1002 may include a transceiver component, such as the transceiver 1112 (FIG. 11), to process data 1026 to generate signals for transmission by the transmission component 1012 as data 1028. After data 1028 is reported to the eNB 1050, the reception component 1004 may receive an RRC release message from the eNB 1050 (e.g., as data 1014). Based at least in part on the RRC release message, the reception component 1004 may provide information to the PSM component 1006 (e.g., as data 1016), which may cause the PSM component 1006 to reset the PSM timer and/or the extended TAU timer.

The apparatus 1002 may include additional components that perform each of the blocks of the algorithm in the aforementioned flow chart of FIG. 9. As such, each block in the aforementioned flow charts of FIG. 9 may be performed by a component, and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
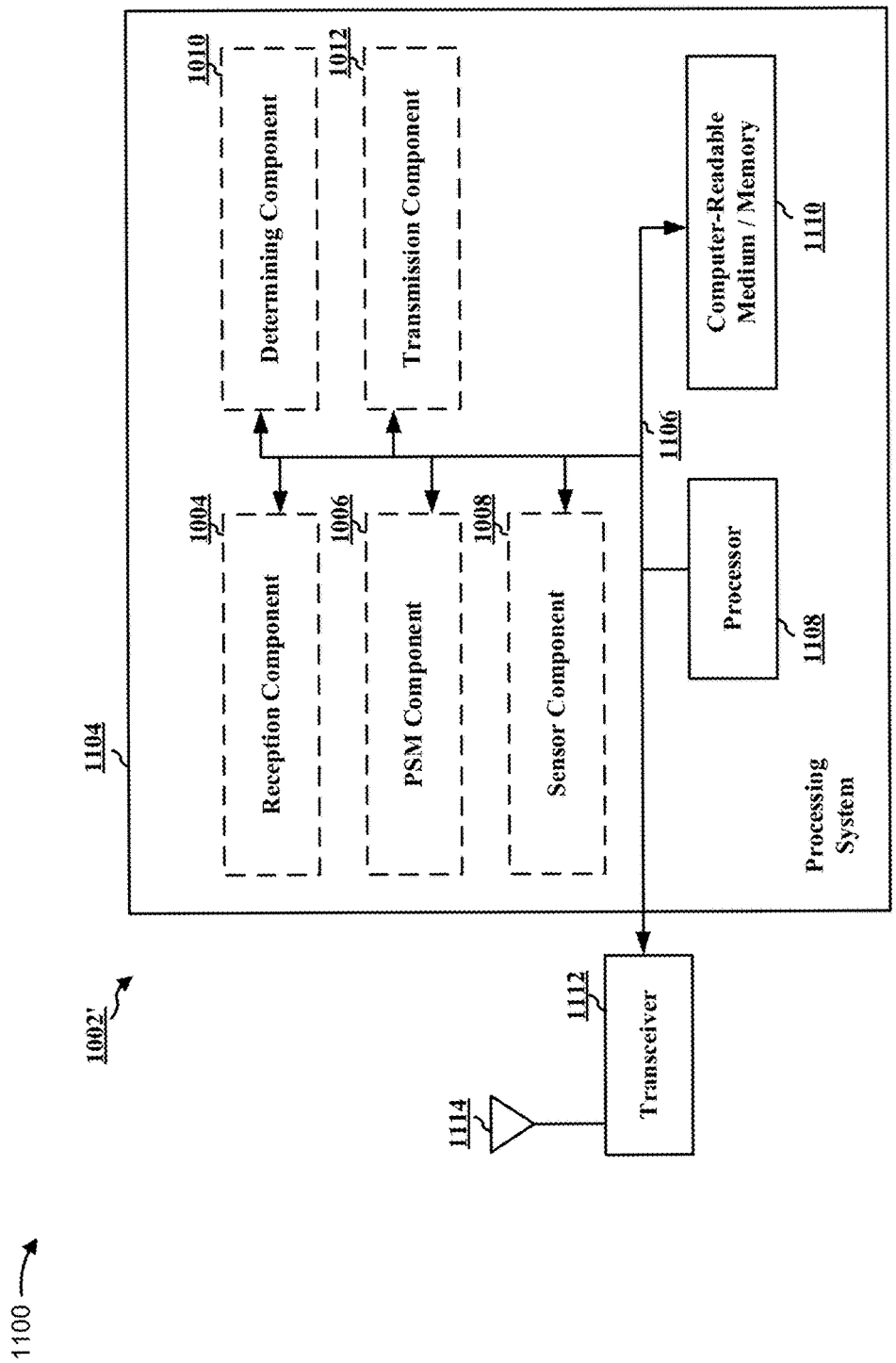
FIG. 11 is a diagram illustrating an example of a hardware implementation for an apparatus employing a processing system, in accordance with various aspects of the present disclosure.

FIG. 11 is a diagram illustrating an example of a hardware implementation 1100 for an apparatus 1002' employing a processing system 1104. The processing system 1104 may be implemented with a bus architecture, represented generally by a bus 1106. The bus 1106 may include any number of interconnecting buses and bridges depending on the specific application of the processing system 1104 and the overall design constraints. The bus 1106 links together various circuits, including one or more processors and/or hardware modules, represented by a processor 1108, a computer-readable medium/memory 1110, a transceiver 1112, one or more antennas 1114, and the components 1004, 1006, 1008, 1010, and 1012. The bus 1106 may also link various other circuits such as timing sources, peripherals, voltage regulators, and power management circuits, which are well known in the art, and therefore, will not be described any further.

Dashed lines of components 1004, 1006, 1008, 1010, and 1012 indicate that the components 1004, 1006, 1008, 1010, and 1012 are provided for illustration but may be implemented as software or firmware components of, for example, processor 1108. Additionally, or alternatively, additional components, fewer components, or a different combination of components may be implemented as software or firmware components of, for example, processor 1108.

The processing system 1104 may be coupled to a transceiver 1112. The transceiver 1112 is coupled to one or more antennas 1114. The transceiver 1112 provides a means for communicating with various other apparatus over a transmission medium. The transceiver 1112 receives a signal from the one or more antennas 1114, extracts information from the received signal, and provides the extracted information to the processing system 1104, specifically the reception component 1004. In addition, the transceiver 1112 receives information from the processing system 1104, specifically the transmission component 1012, and based at least in part on the received information, generates a signal to be applied to the one or more antennas 1114. The processing system 1104 includes a processor 1108 coupled to a computer-readable medium/memory 1110. The processor 1108 is responsible for general processing, including the execution of software stored on the computer-readable medium/memory 1110. The software, when executed by the processor 1108, causes the processing system 1104 to perform the various functions described supra for any particular apparatus. The computer-readable medium/memory 1110 may also be used for storing data that is manipulated by the processor 1108 when executing software. The processing system further includes at least one of the components 1004, 1006, 1008, 1010, and/or 1012. The components may be software modules running in the processor 1108, resident/stored in the computer readable medium/memory 1110, one or more hardware components coupled to the processor 1108, or some combination thereof. The processing system 1104 may be a component of the UE 145, 250 and may include the memory 665 and/or at least one of the TX processor 680, the RX processor 650, and the controller/processor 660.

In some aspects, the processor 1108 may be implemented as multiple processors 1108, such as in an application processor 1108, a baseband processor 1108, a graphical processor 1108, and/or the like.

In one configuration, the apparatus 1002' for wireless communication includes means for entering a power saving mode, means for receiving sensor information, means for determining that the sensor information satisfies a condition, means for deactivating the power saving mode, means for reporting to the network, and means for resetting one or more timers described herein. The aforementioned means may be one or more of the aforementioned modules of the apparatus 1002 and/or the processing system 1104 of the apparatus 1002' configured to perform the functions recited by the aforementioned means. As described supra, the processing system 1104 may include the TX processor 680, the RX processor 650, and the controller/processor 660. As such, in one configuration, the aforementioned means may be the TX processor 680, the RX processor 650, and the controller/processor 660 configured to perform the functions recited by the aforementioned means.

Figure 12:
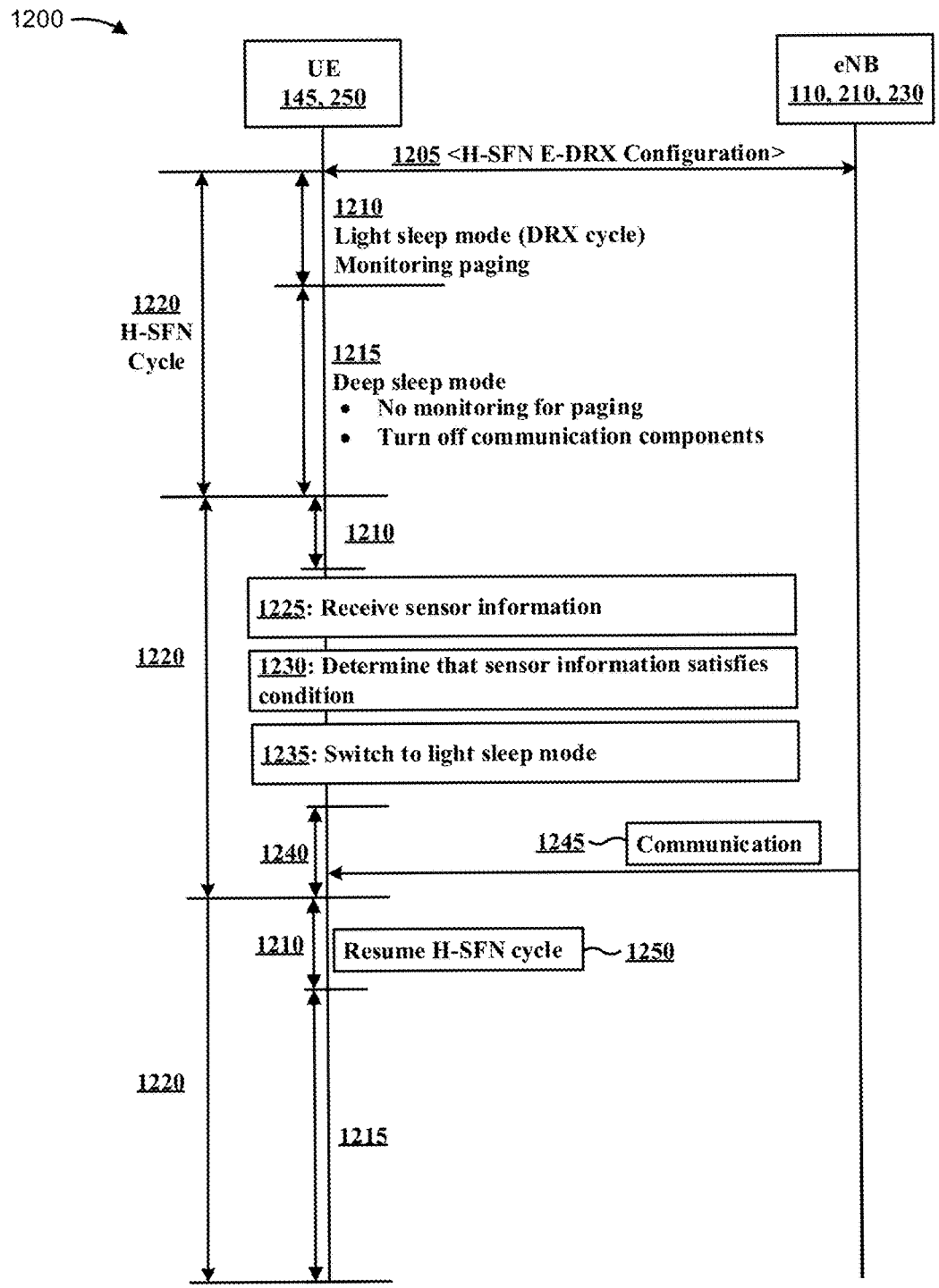
FIG. 12 is a diagram illustrating an example system configured to deactivate a deep sleep mode, or switch from the deep sleep mode to a light sleep mode, based at least in part on sensor information obtained by a sensor, in accordance with various aspects of the present disclosure.

FIG. 12 is a diagram illustrating an example system 1200 configured to deactivate a deep sleep mode, or switch from the deep sleep mode to a light sleep mode, based at least in part on sensor information obtained by a sensor. As shown in FIG. 12, example system 1200 may include a UE 145, 250 and an eNB 110, 210, 230. In some aspects, the UE 145, 250 may be a category M1 UE.

As shown in FIG. 12, and by reference number 1205, the UE 145, 250 and the eNB 110, 210, 230 may communicate to configure an extended DRX (E-DRX) cycle. Here, the E-DRX cycle is an H-SFN cycle. In some aspects, the cycle may include a cycle other than an E-DRX cycle and/or an H-SFN cycle. For example, the cycle may include any cycle having a deep sleep mode wherein the UE 145, 250 is unreachable by the eNB 110, 210, 230 and a light sleep mode wherein the UE 145, 250 is capable of receiving and decoding communications from the eNB 110, 210, 230.

As shown by reference number 1210, the H-SFN cycle 1220 may include a light sleep mode. The light sleep mode may include, for example, a DRX configuration corresponding to an RRC-idle mode wherein the UE 145, 250 periodically receives network communications during paging occasions. For example, the paging occasions may occur at an interval of frames (e.g., every 32 frames, 64 frames, 128 frames, and/or the like).

As shown by reference number 1215, the H-SFN cycle 1220 may include a deep sleep mode. The UE 145, 250 may be unreachable by the eNB 110, 210, 230 during the deep sleep mode. For example, during the deep sleep mode, the UE 145, 250 may not monitor for paging by the eNB 110, 210, 230, and may turn off communication components of the UE 145, 250. For example, the sleep mode component 1406 (FIG. 14), may deactivate a reception component 1404 (FIG. 14) and/or a transmission component 1412 (FIG. 14) of the UE 145, 250. In some aspects, the deep sleep mode may include a PSM and/or the like.

If a network communication were to be provided to the UE 145, 250 during the deep sleep mode, the UE 145, 250 may not receive the network communication until the UE 145, 250 enters the light sleep mode. This may cause delay in reception of the network communication, which may be problematic in some circumstances. For example, the network communication may include emergency information and/or another type of information that is intended to be expeditiously received by the UE 145, 250.

As shown by reference number 1225, the UE 145, 250 may receive sensor information during a deep sleep mode of the H-SFN cycle 1220. For example, a sensor component 1408 associated with the UE 145, 250 may provide the sensor information to a determining component 1410 associated with the UE 145, 250. The sensor information may include the information described in connection with reference number 825 of FIG. 8, above.

As shown by reference number 1230, the UE 145, 250 may determine that the sensor information satisfies a condition. For example, the determining component 1410 of the UE 145, 250 may compare the sensor information to a threshold to determine whether the sensor information satisfies the condition. In some aspects, the UE 145, 250 may be configured to store one or more threshold values in a look-up table. For example, the look-up table may store threshold values for different types of sensor information (e.g., a temperature measurement, a pressure measurement, etc.) The UE 145, 250 may use the look-up table to determine whether the sensor information satisfies one or more thresholds.

If the condition is not satisfied, then the UE 145, 250 may continue to operate in the deep sleep mode according to the H-SFN cycle 1220. However, if the condition is satisfied, then the UE 145, 250 may switch from the deep sleep mode to a light sleep mode, as shown by reference number 1235. For example, a sleep mode component 1406 of the UE 145, 250 may activate one or more communication components (e.g., the reception component 1404 and/or the transmission component 1412) to communicate with the eNB 110, 210, 230.

The UE 145, 250 may operate in the light sleep mode after switching to the light sleep mode, as shown by reference number 1240. During the light sleep mode, the UE 145, 250 may receive a network communication, shown by reference number 1245. In some aspects, the UE 145, 250 may receive the network communication in a next paging occasion after entering the light sleep mode. For example, the UE 145, 250 may receive the sensor information based at least in part on the eNB 110, 210, 230 failing to communicate the network communication to the UE 145, 250 during the deep sleep mode. The UE 145, 250 may enter the light sleep mode to enable retransmission of the network communication during the next paging occasion, which may occur sooner than a scheduled end of the deep sleep mode.

As shown by reference number 1250, in some aspects, the UE 145, 250 may resume the H-SFN cycle 1220 after receiving the network communication. For example, the sleep mode component 1406 of the UE 145, 250 may selectively activate and deactivate the reception component 1404 and/or the transmission component 1412 based at least in part on the H-SFN cycle 1220. In some aspects, the UE 145, 250 may resume the H-SFN cycle 1220 based at least in part on completing an action associated with or identified by the network communication. For example, the UE 145, 250 may transmit information to the eNB 110, 210, 230, may configure a component, may actuate a component, or may perform any other action based at least in part on the network communication.

In this way, the UE 145, 250 is awakened from a deep sleep mode to receive a network communication, which reduces delay of the network communication due to the deep sleep mode, and which improves versatility of the deep sleep mode, thereby conserving battery power of the UE 145, 250 as compared to keeping the UE 145, 250 in a light sleep mode to receive the network communication.

As indicated above, FIG. 12 is provided as an example. Other examples are possible and may differ from what was described in connection with FIG. 12.

Figure 13:
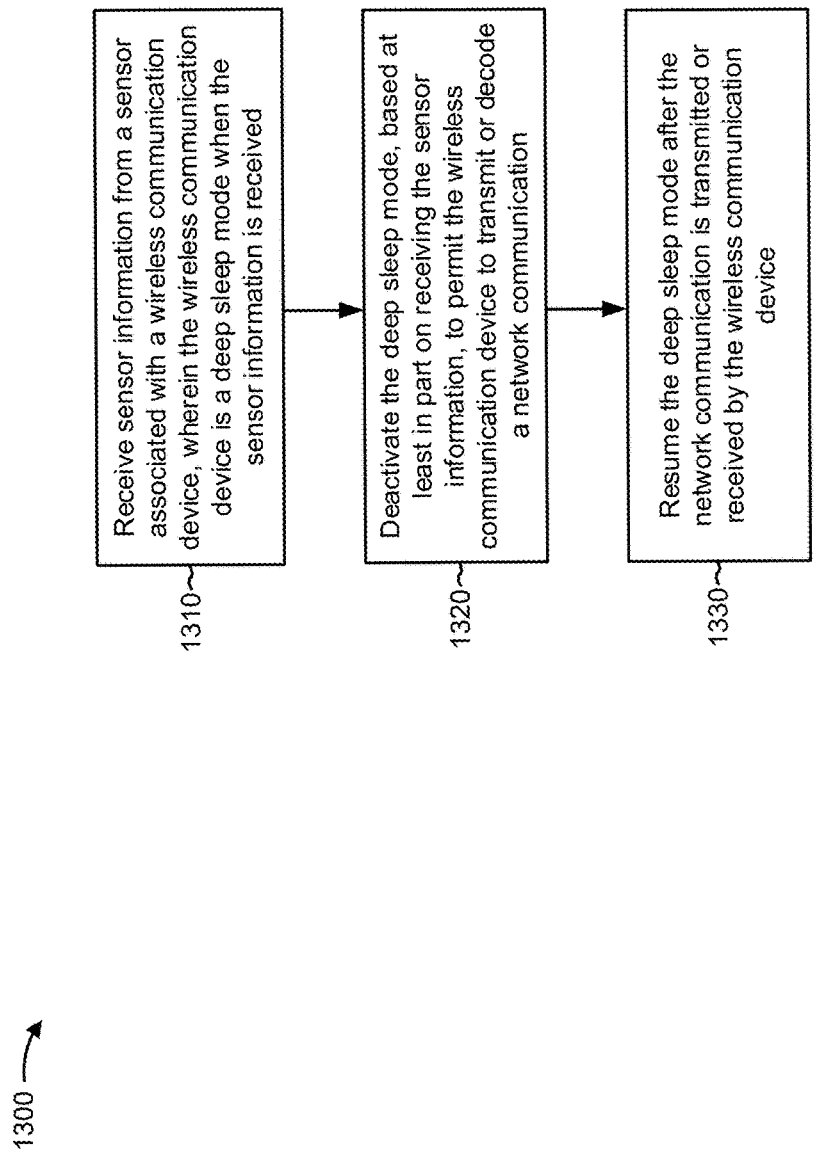
FIG. 13 is another flow chart of a method of wireless communication, in accordance with various aspects of the present disclosure.

FIG. 13 is a flow chart 1300 of a method of wireless communication. The method may be performed by a UE (e.g., the UE 145, 250 and/or an apparatus 1402/1402', described in more detail below).

At 1310, the UE receives sensor information from a sensor associated with the UE, wherein the UE is in a deep sleep mode when the sensor information is received. For example, the deep sleep mode may include a PSM or another mode wherein the UE is unreachable by an eNB based at least in part on deactivation of a reception component and/or a transmission component of the UE.

At 1320, the UE deactivates the deep sleep mode, based at least in part on receiving the sensor information, to permit the UE to transmit or decode a network communication. In some aspects, the UE may switch from the deep sleep mode to a light sleep mode (e.g., a DRX mode and/or the like) wherein a reception component and/or a transmission component of the UE are active.

At 1330, the UE may resume the deep sleep mode after the network communication is transmitted or received by the UE. In some aspects, the UE may switch from the light sleep mode back to the deep sleep mode based at least in part on performing or completing an action identified by the communication. Additionally, or alternatively, the UE may switch from the light sleep mode back to the deep sleep mode based at least in part on a cycle (e.g., an H-SFN cycle or an E-DRX cycle).

In some aspects, the deep sleep mode may be configured according to a hyper system frame number (H-SFN) cycle of the UE. For example, in some aspects, the H-SFN cycle may be configured according to an extended discontinuous reception (E-DRX) cycle of the UE. In some aspects, the deep sleep mode may include a power saving mode of the UE.

In some aspects, the deep sleep mode may correspond to a periodic tracking area update timer. In some aspects, the UE may reset the periodic tracking area update time based at least in part on reporting to a network (e.g., an eNB).

In some aspects, the UE, when deactivating the deep sleep mode, may switch the UE to a light sleep mode, wherein the light sleep mode includes a discontinuous reception (DRX) cycle corresponding to a Radio Resource Control (RRC) idle mode of the UE.

In some aspects, the UE may resume the deep sleep mode after the network communication is transmitted or received by the UE. In some aspects, the UE may resume the deep sleep mode based at least in part on completing an action associated with or identified by the network communication.

In some aspects, the network communication may be received in a next paging occasion after the UE deactivates the deep sleep mode. In some aspects, the UE may include a machine-type communication (MTC) device, an Internet of Things (IoT) device, a category M1 wireless communication device, a category narrow band IoT (NB-IoT) device, or a machine-to-machine (M2M) device. In some aspects, the UE may include the sensor. In some aspects, the sensor may be configured to detect a particular stimulus and the UE may be configured to deactivate the deep sleep mode based at least in part on the sensor detecting the particular stimulus. In some aspects, the deep sleep mode may be deactivated based at least in part on a determination that the sensor information satisfies a threshold.

Although FIG. 13 shows example blocks of a method of wireless communication, in some aspects, the method may include additional blocks, fewer blocks, different blocks, or differently arranged blocks than those shown in FIG. 13. Additionally, or alternatively, two or more blocks shown in FIG. 13 may be performed in parallel.

Figure 14:
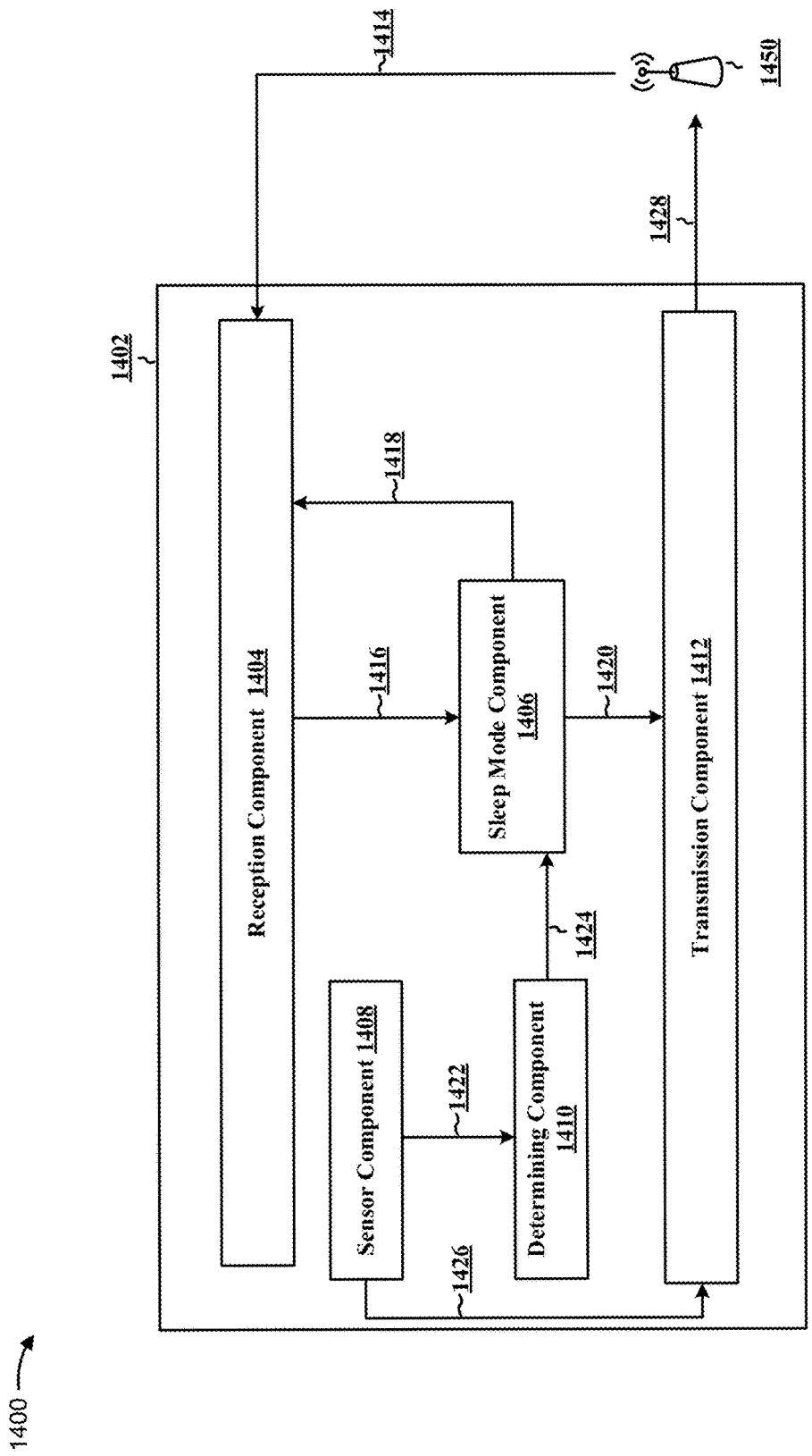
FIG. 14 is another conceptual data flow diagram illustrating the data flow between different modules/means/components in an example apparatus, in accordance with various aspects of the present disclosure.

FIG. 14 is a conceptual data flow diagram 1400 illustrating the data flow between different modules/means/components in an example apparatus 1402. In some aspects, the apparatus 1402 may be a UE (e.g., the UE 145, 250). As shown, the apparatus 1402 may include a reception component 1404, a sleep mode component 1406, a sensor component 1408, a determining component 1410, and a transmission component 1412. In some aspects, components 1404 through 1412 and/or other components may be software components, hardware components, a combination of software components and firmware components, and/or the like. For example, a UE may implement components 1404 through 1412 and/or other modules as software components of a processing system, such as a baseband processor of the UE, an application processor of the UE, an RX processor 650 of the UE, a TX processor 680 of the UE, a controller/processor 660 of the UE, and/or the like. Additionally, or alternatively, components 1404 through 1412 may be implemented in other ways than as described herein.

The reception component 1404 may receive data 1414, which may include one or more messages from an eNB 1450 (e.g., which may correspond to one or more of the eNBs 110, 210, 230). For example, the reception component 1404 may receive one or more messages described in connection with FIG. 12, such as messages to configure an E-DRX cycle and/or an H-SFN cycle. As shown, the reception component 1404 may provide data 1414 (e.g., which may be processed by the reception component 1404) as output to the sleep mode component 1406 (e.g., as data 1416).

The sleep mode component 1406 may receive data 1416 from the reception component 1404. Based at least in part on data 1416, the sleep mode component 1406 may configure a deep sleep mode and a light sleep mode. The sleep mode component 1406 may enter a deep sleep mode based at least in part on an E-DRX cycle and/or an H-SFN cycle. For example, the sleep mode component 1406 may provide an instruction to the reception component 1404 (e.g., as data 1418) to cause the reception component 1404 to be powered off, and/or may provide an instruction to the transmission component 1412 (e.g., as data 1420) to cause the transmission component 1412 to be powered off. Similarly, the sleep mode component 1406 may cause the reception component 1404 and/or the transmission component 1412 to be powered on for the light sleep mode.

The sensor component 1408 may measure and/or receive sensor information, and may provide the sensor information to the determining component 1410 (e.g., as data 1422). The determining component 1410 may receive the sensor information, and may determine that the sensor information satisfies a condition. The determining component 1410 may provide an indication (e.g., as data 1424), to the sleep mode component 1406, to indicate that the sensor information satisfies the condition. The sleep mode component 1406 may deactivate the power saving mode based at least in part on this indication. For example, the sleep mode component 1406 may provide an instruction to the reception component 1404 (e.g., as data 1418) to cause the reception component 1404 to be powered on, and/or may provide an instruction to the transmission component 1412 (e.g., as data 1420) to cause the transmission component 1412 to be powered on.

As further shown, the sensor component 1408 may provide sensor information (e.g., as data 1426) to the transmission component 1412. The transmission component 1412 may report data 1428 to the eNB 1450. Data 1428 may include, for example, the sensor information, data derived from the sensor information, an alert, a TAU message, or any combination thereof. In some aspects, the apparatus 1402 may include a transceiver component, such as the transceiver 1512 (FIG. 15), to process data 1426 to generate signals for transmission by the transmission component 1412 as data 1428.

The apparatus 1402 may include additional components that perform each of the blocks of the algorithm in the aforementioned flow chart of FIG. 13. As such, each block in the aforementioned flow charts of FIG. 13 may be performed by a component, and the apparatus 1402 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
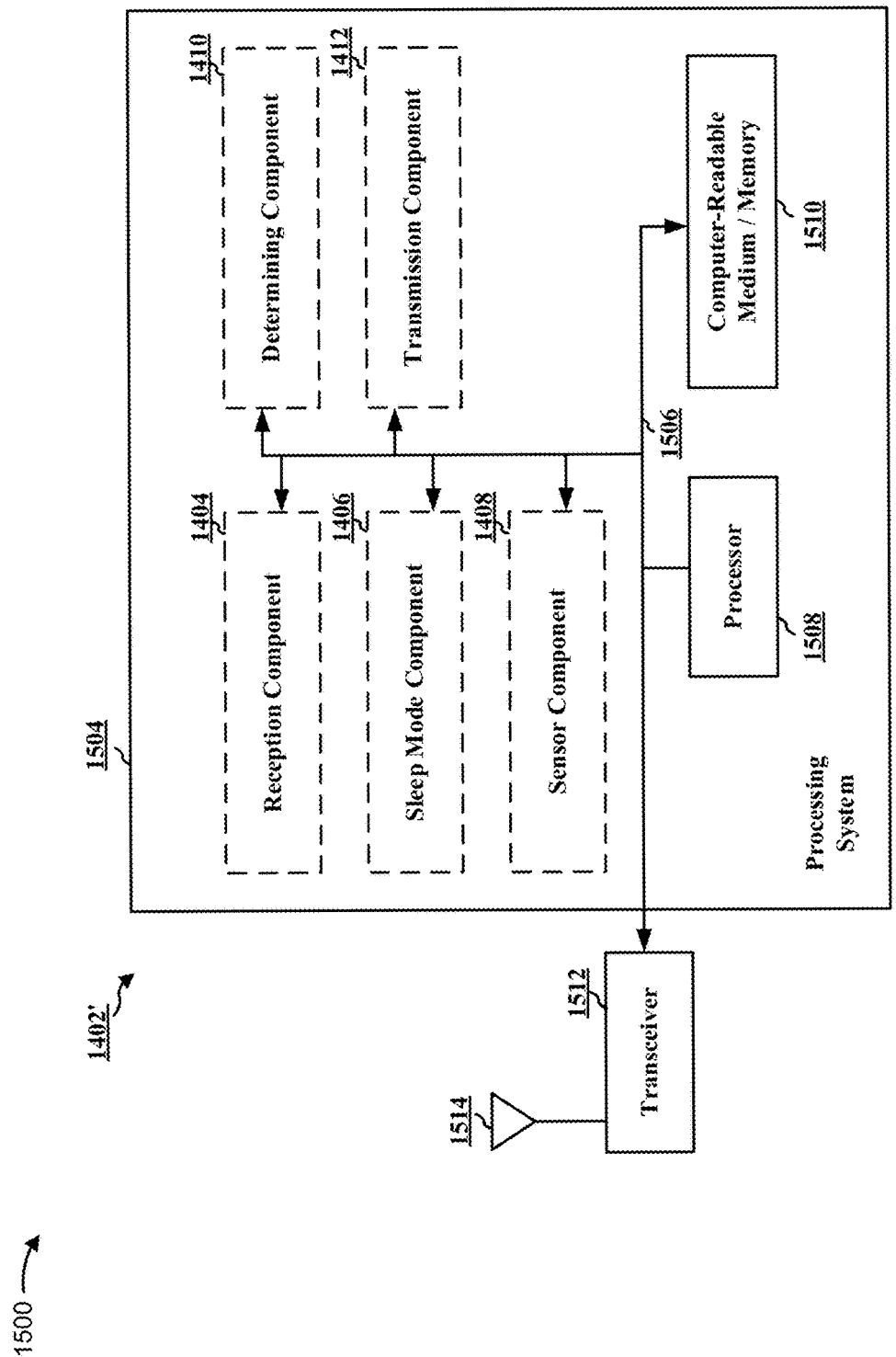
FIG. 15 is another diagram illustrating an example of a hardware implementation for an apparatus employing a processing system, in accordance with various aspects of the present disclosure.

FIG. 15 is a diagram illustrating an example of a hardware implementation 1500 for an apparatus 1402' employing a processing system 1504. The processing system 1504 may be implemented with a bus architecture, represented generally by a bus 1506. The bus 1506 may include any number of interconnecting buses and bridges depending on the specific application of the processing system 1504 and the overall design constraints. The bus 1506 links together various circuits, including one or more processors and/or hardware modules, represented by a processor 1508, a computer-readable medium/memory 1510, a transceiver 1512, one or more antennas 1514, and the components 1404, 1406, 1408, 1410, and 1412. The bus 1506 may also link various other circuits such as timing sources, peripherals, voltage regulators, and power management circuits, which are well known in the art, and therefore, will not be described any further.

Dashed lines of components 1404, 1406, 1408, 1410, and 1412 indicate that the components 1404, 1406, 1408, 1410, and 1412 are provided for illustration but may be implemented as software or firmware components of, for example, processor 1508. Additionally, or alternatively, additional components, fewer components, or a different combination of components may be implemented as software or firmware components of, for example, processor 1508.

The processing system 1504 may be coupled to a transceiver 1512. The transceiver 1512 is coupled to one or more antennas 1514. The transceiver 1512 provides a means for communicating with various other apparatus over a transmission medium. The transceiver 1512 receives a signal from the one or more antennas 1514, extracts information from the received signal, and provides the extracted information to the processing system 1504, specifically the reception component 1404. In addition, the transceiver 1512 receives information from the processing system 1504, specifically the transmission component 1412, and based at least in part on the received information, generates a signal to be applied to the one or more antennas 1514. The processing system 1504 includes a processor 1508 coupled to a computer-readable medium/memory 1510. The processor 1508 is responsible for general processing, including the execution of software stored on the computer-readable medium/memory 1510. The software, when executed by the processor 1508, causes the processing system 1504 to perform the various functions described supra for any particular apparatus. The computer-readable medium/memory 1510 may also be used for storing data that is manipulated by the processor 1508 when executing software. The processing system further includes at least one of the components 1404, 1406, 1408, 1410, and/or 1412. The components may be software modules running in the processor 1508, resident/stored in the computer readable medium/memory 1510, one or more hardware components coupled to the processor 1508, or some combination thereof. The processing system 1504 may be a component of the UE 145, 250 and may include the memory 665 and/or at least one of the TX processor 680, the RX processor 650, and the controller/processor 660.

In some aspects, the processor 1508 may be implemented as multiple processors 1508, such as in an application processor 1508, a baseband processor 1508, a graphical processor 1508, and/or the like.

In one configuration, the apparatus 1402' for wireless communication includes means for receiving sensor information, means for deactivating a deep sleep mode, means for resetting a periodic tracking area update timer, and/or means for resuming the deep sleep mode. The aforementioned means may be one or more of the aforementioned modules of the apparatus 1402 and/or the processing system 1504 of the apparatus 1402' configured to perform the functions recited by the aforementioned means. As described supra, the processing system 1504 may include the TX processor 680, the RX processor 650, and the controller/processor 660. As such, in one configuration, the aforementioned means may be the TX processor 680, the RX processor 650, and the controller/processor 660 configured to perform the functions recited by the aforementioned means.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based at least in part on" is intended to mean "based, at least in part, on" unless explicitly stated otherwise.

What is claimed is:

1. A method of wireless communication for a wireless communication device, comprising:
    entering an idle mode for a first time period indicated by a power saving mode (PSM) timer;
    entering, after expiration of the PSM timer, a deep sleep mode for a second time period indicated by a different timer;
    receiving sensor information from a sensor associated with the wireless communication device,
        wherein the wireless communication device is in the deep sleep mode when the sensor information is received; and
    deactivating the deep sleep mode, based at least in part on receiving the sensor information, to permit the wireless communication device to transmit or decode a network communication,
        wherein the deep sleep mode is associated with an extended paging cycle.

2. The method of claim 1, wherein the deep sleep mode is configured according to a hyper system frame number (H-SFN) cycle of the wireless communication device.

3. The method of claim 2, wherein the H-SFN cycle is configured according to an extended discontinuous reception (E-DRX) cycle of the wireless communication device.

4. The method of claim 1, wherein the deep sleep mode comprises a power saving mode of the wireless communication device.

5. The method of claim 1, wherein the different timer is a periodic tracking area update timer.

6. The method of claim 1, further comprising:
resetting the different timer based at least in part on reporting to a network.

7. The method of claim 1, wherein deactivating the deep sleep mode comprises switching the wireless communication device to a light sleep mode,
wherein the light sleep mode includes a discontinuous reception (DRX) cycle corresponding to a Radio Resource Control (RRC) idle mode of the wireless communication device.

8. The method of claim 1, further comprising:
resuming the deep sleep mode after the network communication is transmitted or received by the wireless communication device.

9. The method of claim 8, wherein resuming the deep sleep mode comprises:
resuming the deep sleep mode based at least in part on completing an action associated with or identified by the network communication.

10. The method of claim 1, wherein the network communication is received in a next paging occasion after the wireless communication device deactivates the deep sleep mode.

11. The method of claim 1, wherein the wireless communication device includes a machine-type communication (MTC) device, an Internet of Things (IoT) device, a category M1 wireless communication device, a category narrow band IoT (NB-IoT) device, or a machine-to-machine (M2M) device.

12. The method of claim 1, wherein the wireless communication device includes the sensor.

13. The method of claim 1, wherein the sensor is configured to detect a particular stimulus and the wireless communication device is configured to deactivate the deep sleep mode based at least in part on the sensor detecting the particular stimulus.

14. The method of claim 1, wherein the deep sleep mode is deactivated based at least in part on a determination that the sensor information satisfies a threshold.

15. A device, comprising:
a memory; and
one or more processors operatively coupled to the memory, the one or more processors being configured to:
enter an idle mode for a first time period indicated by a power saving mode (PSM) timer;
enter, after expiration of the PSM timer, a deep sleep mode for a second time period indicated by a different timer;
receive sensor information from a sensor associated with the device,
wherein the device in the deep sleep mode when the sensor information is received; and
deactivate the deep sleep mode, based at least in part on receiving the sensor information, to permit the device to transmit or decode a network communication,
wherein the deep sleep mode is associated with an extended paging cycle.

16. The device of claim 15, wherein the deep sleep mode is configured according to a hyper system frame number (H-SFN) cycle of the device.

17. The device of claim 16, wherein the H-SFN cycle is configured according to an extended discontinuous reception (E-DRX) cycle of the device.

18. The device of claim 15, wherein the deep sleep mode comprises a power saving mode of the device.

19. The device of claim 15, wherein the different timer is a periodic tracking area update timer.

20. The device of claim 15, wherein the one or more processors, when deactivating the deep sleep mode, are to switch the device to a light sleep mode,
wherein the light sleep mode includes a discontinuous reception (DRX) cycle corresponding to a Radio Resource Control (RRC) idle mode of the device.

21. A non-transitory computer-readable medium storing one or more instructions for wireless communication,
the one or more instructions, when executed by one or more processors of a wireless communication device, causing the one or more processors to:
enter an idle mode for a first time period indicated by a power saving mode (PSM) timer;
enter, after expiration of the PSM timer, a deep sleep mode for a second time period indicated by a different timer;
receive sensor information from a sensor associated with the wireless communication device,
wherein the wireless communication device is in the deep sleep mode when the sensor information is received; and
deactivate the deep sleep mode, based at least in part on receiving the sensor information, to permit the wireless communication device to transmit or decode a network communication,
wherein the deep sleep mode is associated with an extended paging cycle.

22. The non-transitory computer-readable medium of claim 21, wherein the deep sleep mode is configured according to a hyper system frame number (H-SFN) cycle of the wireless communication device.

23. The non-transitory computer-readable medium of claim 22, wherein the H-SFN cycle is configured according to an extended discontinuous reception (E-DRX) cycle of the wireless communication device.

24. The non-transitory computer-readable medium of claim 21, wherein the deep sleep mode comprises a power saving mode of the wireless communication device.

25. The non-transitory computer-readable medium of claim 21, wherein the deep sleep mode is deactivated based at least in part on a determination that the sensor information satisfies a threshold.

26. An apparatus for wireless communication, comprising:
means for entering an idle mode for a first time period indicated by a power saving mode (PSM) timer;
means for entering, after expiration of the PSM timer, a deep sleep mode for a second time period indicated by a different timer;
means for receiving sensor information from a sensor associated with the apparatus,
wherein the apparatus is in the deep sleep mode when the sensor information is received; and
means for deactivating the deep sleep mode, based at least in part on receiving the sensor information, to permit the apparatus to transmit or decode a network communication,
wherein the deep sleep mode is associated with an extended paging cycle.

27. The apparatus of claim 26, wherein the deep sleep mode comprises a power saving mode of the apparatus.

28. The apparatus of claim 26, wherein the deep sleep mode is configured according to a hyper system frame number (H-SFN) cycle of the apparatus.

29. The apparatus of claim 26, wherein the apparatus includes a machine-type communication (MTC) device, an Internet of Things (IoT) device, a category M1 wireless communication device, a category narrow band IoT (NB-IoT) device, or a machine-to-machine (M2M) device.

30. The apparatus of claim 26, wherein the apparatus includes the sensor.

* * * * *